United States Patent
Onoda

(10) Patent No.: US 9,118,716 B2
(45) Date of Patent: Aug. 25, 2015

(54) COMPUTER SYSTEM, CONTROLLER AND NETWORK MONITORING METHOD

(75) Inventor: Osamu Onoda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 72 days.

(21) Appl. No.: 13/991,409

(22) PCT Filed: Dec. 2, 2011

(86) PCT No.: PCT/JP2011/077933
§ 371 (c)(1),
(2), (4) Date: Jun. 3, 2013

(87) PCT Pub. No.: WO2012/077603
PCT Pub. Date: Jun. 14, 2012

(65) Prior Publication Data
US 2013/0254891 A1 Sep. 26, 2013

(30) Foreign Application Priority Data

Dec. 9, 2010 (JP) ................................. 2010-275002

(51) Int. Cl.
| | |
|---|---|
| *G06F 21/55* | (2013.01) |
| *H04L 12/931* | (2013.01) |
| *H04L 12/64* | (2006.01) |
| *H04L 12/44* | (2006.01) |
| *H04L 29/06* | (2006.01) |

(52) U.S. Cl.
CPC ............ *H04L 63/1466* (2013.01); *G06F 21/55* (2013.01); *H04L 12/44* (2013.01); *H04L 12/6418* (2013.01); *H04L 49/35* (2013.01); *H04L 49/70* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 7,234,163 | B1 * | 6/2007 | Rayes et al. ................... | 726/22 |
| 7,516,487 | B1 * | 4/2009 | Szeto et al. ................... | 726/22 |
| 7,562,390 | B1 * | 7/2009 | Kwan ............................. | 726/23 |
| 8,782,789 | B2 * | 7/2014 | Cho ............................... | 726/23 |

FOREIGN PATENT DOCUMENTS

| | | |
|---|---|---|
| CN | 1682516 A | 10/2005 |
| CN | 101883090 A | 11/2010 |
| JP | 2005-210451 A | 8/2005 |

OTHER PUBLICATIONS

OpenFlow Switch Specification Version 1.0.0 (Wire Protocol 0x01) Dec. 31, 2009.
English translation of PCT/ISA/237 (written opinion of the international searching authority, dated Dec. 27, 2011).
(Continued)

*Primary Examiner* — Gilberto Barron, Jr.
*Assistant Examiner* — Wayne An
(74) *Attorney, Agent, or Firm* — McGinn IP Law Group, PLLC

(57) ABSTRACT

The computer system includes: a controller; a switch configured to perform, on a received packet complying with a flow entry set by the controller, a relay operation regulated by the flow entry; and a host terminal configured to be connected to the switch. The switch notifies the controller of transmission source address information of a received packet which does not comply with a flow entry set for itself. The controller judges, when legal address information of a host terminal does not coincide with the transmission source address information, that a transmission source address of the received packet is spoofed.

29 Claims, 17 Drawing Sheets

(56) References Cited

OTHER PUBLICATIONS

PCT/IB/373 dated Jun. 12, 2013.
International Search Report dated Dec. 15, 2011 in PCT/JP2011/077933, with English translation thereof.
RFC 5227 (Update:826) IPv4 Address Conflict Detection, Network Working Group, S Cheshire, Apple Inc., Jul. 2008.
Martin Casado et al, "Ethane; Taking Control of the Enterprise", SIGCOM' 07 Proceedings of the 2007 conference on Application, tecnolohies, architectures, and protocol for computer communications, vol. 37 Iss. 4, Oct. 2007, pp. 1-12, 2.2 Ehane in Use, 3.3 Controller.
Chinese Office Action dated Feb. 10, 2015 with English Translation.
Yap et al., "The Stanford OpenRoads Deployment", ACM WiNTECH '09, Dec. 31, 2009.
Braga et al., "Lightweight DDoS Flooding Attack Detection Using NOX/OpenFlow", Local Computer Networks (LCN), 2010 IEEE 35th Conference on, p. 408-415, Oct. 14, 2010.

* cited by examiner

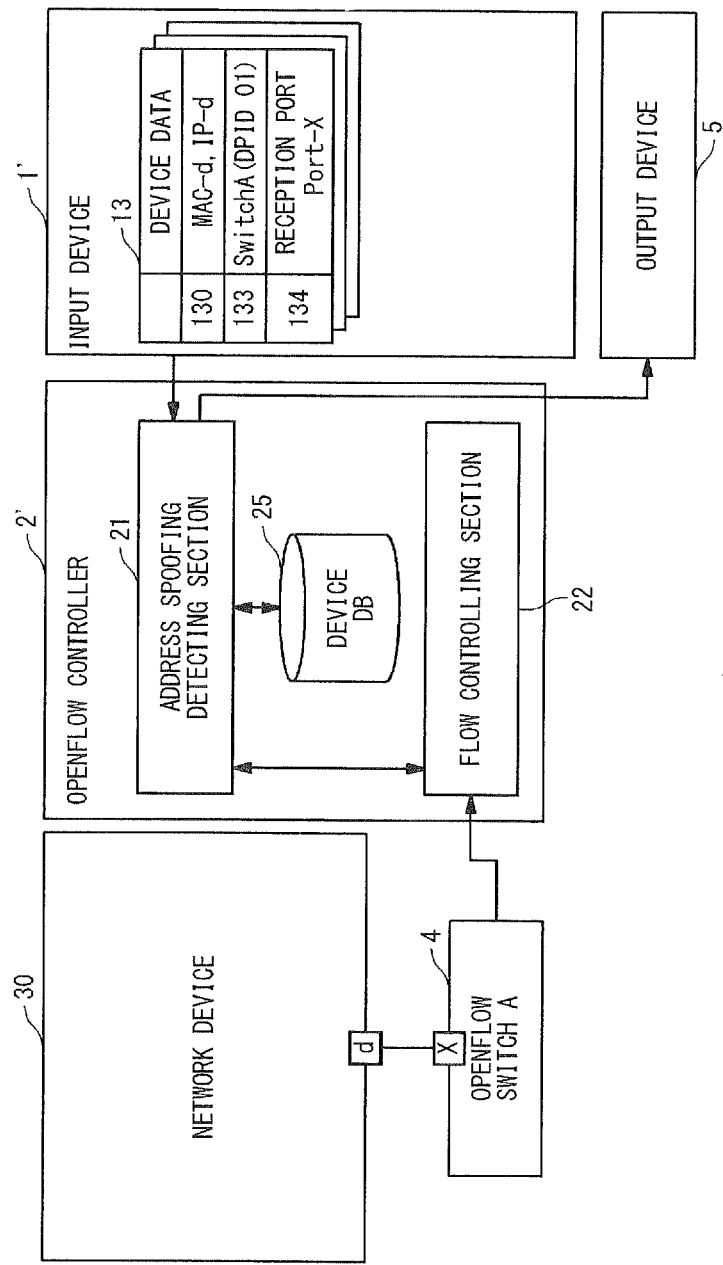

COMPUTER SYSTEM, CONTROLLER AND NETWORK MONITORING METHOD

TECHNICAL FIELD

The present invention relates to a computer system, a controller, a monitoring method and a network monitoring program, and more particularly relates to a computer system using an openflow technique, and a network monitoring method for blocking an address spoofed packet.

BACKGROUND ART

In a layer 2 network, a MAC (Media Access Control) address is used in order to uniquely identify network devices (including computers and virtual machines) configuring a network. However, there is a problem that the MAC address can be easily spoofed. On the other hand, when a route of a packet flowing in the layer 2 network is changed in association with a physical transfer of a computer or a transfer of a virtual machine, Gratuitous ARP (Address Resolution Protocol) is widely known to be advantageous (refer to a non-patent literature 1). The Gratuitous ARP is an ARP request packet in which its' own IP (Internet Protocol) address is set to a target IP address and provides two effects. One lies in the effect of finding out whether or not a something except itself uses the same IP address. If a different network device that uses the target IP address set in the ARP request packet sends back the ARP Reply, the IP address can be judged to be duplicative. The other effect lies in a fact that a switch configuring the layer 2 network updates its own ARP table and MAC table with reference to a transmission source MAC address of the Gratuitous ARP packet, and consequently can follow the transfer of the computer and/or virtual computer to change the transfer route of the packet. However, by using this property, a trouble can be induced in the network. For example, when the Gratuitous ARP packet in which the transmission source MAC address or target IP address is spoofed is transmitted by an illegal third party, the ARP table or MAC table of the switch configuring the layer 2 network is rewritten. Consequently, a TCP/IP communication of a legal user is easily interrupted. Moreover, a packet to be sent to the legal user can be intercepted because the packet is changed to be sent to an illegal person.

A technique for monitoring and preventing illegal access and interruption using the foregoing ARP packet is described in, for example, JP 2005-210451A (refer to a patent literature 1). A system described in the patent literature 1 includes a monitoring host for monitoring an ARP request packet, and a database in which an IP address and physical address of a legal host inside a network are registered in advance. The monitoring host, when detecting an ARP request packet for the IP address or physical address that is not registered in the database, transmits the ARP request packet whose request source is the above monitoring host itself, to a request destination node of the ARP packet, and updates the ARP table of the node. Consequently, a reply packet to the illegal access is transferred to a monitor server without being sent to the illegal third party.

In this way, the system described in the patent literature 1 can prevent the illegal access to the network, because the monitor server that detects the illegal ARP packet controls the transfer destination of the packet in the node.

On the other hand, a technique in which transfer operations and the like in respective switches are unitarily controlled by an external controller in a computer network (openflow) is proposed by the OpenFlow Consortium (refer to a non-patent literature 2). A network switch (hereinafter, referred to as an openflow switch (OFS)) corresponding to the above technique holds detailed information such as a protocol type, a port number and the like in a flow table, and can control the flow and acquire statistical information. The flow table of the OFS inside the network is unitarily set and managed by an openflow controller (OFC).

With reference to FIG. 1, a configuration and operation of the computer system that uses an openflow protocol are described. With reference to FIG. 1, the computer system based on the technique related to the present invention includes: an openflow controller 100 (hereinafter, referred to as an OFC 100); a switch group 200 including a plurality of open switches 102-1 to 102-n (hereinafter, referred to as OFS 102-1 to 102-n); and a host group 300 including a plurality of host computers 103-1 to 103-i (hereinafter, referred to as hosts 103-1 to 103-i). However, each of n and i is a natural number of 2 or more. In the following explanation, when the OFSs 102-1 to 102-n are not distinguished from each other, they are collectively referred to as an OFS 102. In addition, when the hosts 103-1 to 103-i are not distinguished from each other, they are collectively referred to as a host 103.

The OFC 100 sets a communication route between the hosts 103 and sets a transfer operation (relay operation) to the OFS 102 on the route and the like. At this time, the OFC 100 sets a flow entry in which a rule for specifying a flow (packet data) and an action for defining an operation for the flow are correlated, in a flow table held by the OFS 102. The OFS 102 on the communication route determines a transfer destination of received packet data and carries out a transfer process, in accordance with the flow entry set by the OFC 100. Consequently, the host 103 can transmit and receive the packet data to and from the different host 103 by using the communication route set by the OFC 100. That is, in the computer system that uses the openflow, the OFC 100 for setting the communication route and the OFS 102 for carrying out the transfer process are separated, which enables the communication in the entire system to be unitarily controlled and managed.

With reference to FIG. 1, when the packet is transmitted from the host 103-1 to the host 103-i, the OFS 102-1 refers to transmission destination information (header information: for example, a destination MAC address and a destination IP access) in the packet received from the host 103-1 and searches an entry, which coincides with the header information, from the flow table held inside the OFS 102-1. The content of the entry set in the flow table is defined in, for example, a non-patent literature 2.

If the entry about the received packet data is not described in the flow table, the OFS 102-1 transfers the packet data (hereinafter, referred to as a first packet) or the header information of the first packet to the OFC 100. The OFC 100, which receives the first packet from the OFS 102-1, determines a route 400 on the basis of the information, such as a transmission source host and a transmission destination host, which is included in the packet.

The OFC 100 instructs all of the OFS 102 on the route 400 to set a flow entry for defining the transfer destination of the packet (issue a flow table update instruction). The OFS 102 on the route 400 updates the flow table managed by itself, on the basis of the flow table update instruction. After that, the OFS 102 starts transferring the packet, in accordance with the updated flow table. Consequently, through the route 400 determined by the OFC 100, the packet arrives at the host 103-i of the destination.

CITATION LIST

Patent Literature

[PTL 1] JP 2005-210451A

Non Patent Literature

[NPL 1] RFC 5227 (Updates: 826) IPv4 Address Conflict Detection
[NPL 2] OpenFlow Switch Specification Version 1.0.0 (Wire Protocol 0x01) Dec. 31, 2009

SUMMARY OF INVENTION

As described above, in the network that the transfer destination is determined by using the ARP table for each switch, as shown in the patent literature 1, the technique for by using the spoofed IP address is proposed. However, in the network system in the openflow protocol environment, such an illegal access monitoring technique has not been established.

In addition, there is a possibility that, if the technique described in the patent literature 1 is used, illegal access arises in the time from when the switch replies to the ARP request to when the ARP table is rewritten by the monitoring server. Further, there is a problem that, if the ARP table is updated by the monitoring server before the ARP table is updated by the switch, illegal access cannot be prevented.

Therefore, an object of the present invention is to be able to monitor illegal access to a network in an openflow protocol environment.

In addition, another object of the present invention is to block communication interruption to a network in an openflow protocol environment.

Further, another object of the present invention is to improve security intensity against illegal access and interruption using spoofed address.

A computer system according to the present invention includes: a controller; a switch configured to perform, on a received packet complying with a flow entry set by the controller, a relay operation regulated by the flow entry; and a host terminal configured to be connected to the switch. The switch notifies the controller of transmission source address information of a received packet which does not comply with a flow entry set to itself. The controller judges, when address information of a legal host terminal does not coincide with the transmission source address information, that a transmission source address of the received packet is spoofed.

Further, a controller according to the present invention includes: a flow controlling section; and an address spoofing detecting section. The flow controlling section sets a flow entry to a switch. The switch performs, on a received packet complying with a set flow entry, a relay operation regulated by the flow entry, and notifies the flow controlling section of transmission source address information of a received packet which does not comply with the flow entry set to itself. The address spoofing detecting section judges, when the transmission source address information notified to the flow controlling section does not coincide with address information of a legal host terminal, that a transmission source address of the received packet is spoofed.

A function of a controller according to the present invention is realized by a program stored in a storage device and executed by a computer.

A network monitoring method according to the present invention is a network monitoring method executed by a computer system, which includes a switch configured to perform, on a received packet complying with a flow entry set by a controller, a relay operation regulated by the flow entry. The monitoring method according to the present invention includes: the switch notifying the controller of transmission source address information of a received packet not complying with a flow entry set to itself; and the controller judging, when address information of a legal host terminal does not coincide with the transmission source address information, that a transmission source address of the received packet is spoofed.

According to the present invention, monitoring of illegal access to a network in an openflow protocol environment can be achieved.

In addition, blocking of communication interruption to a network in an openflow protocol environment can be achieved.

Further, improving of security intensity against illegal access and jamming using spoofed address can be achieved.

BRIEF DESCRIPTION OF DRAWINGS

The above and other objects, effects and features of the present invention will be more apparent from the following description of certain preferred exemplary embodiments taken in conjunction with the accompanying drawings, in which:

FIG. 16 is a view showing a specific example to describe a configuration and operation of the computer system in the third exemplary embodiment.

DESCRIPTION OF EXEMPLARY EMBODIMENTS

The exemplary embodiment of the present invention will be described below with reference to the attached drawings. On the drawings, the same or similar reference number indicates the same, similar or equivalent configuration element.

1. First Exemplary Embodiment
(Configuration of Computer System)

Figure 1:
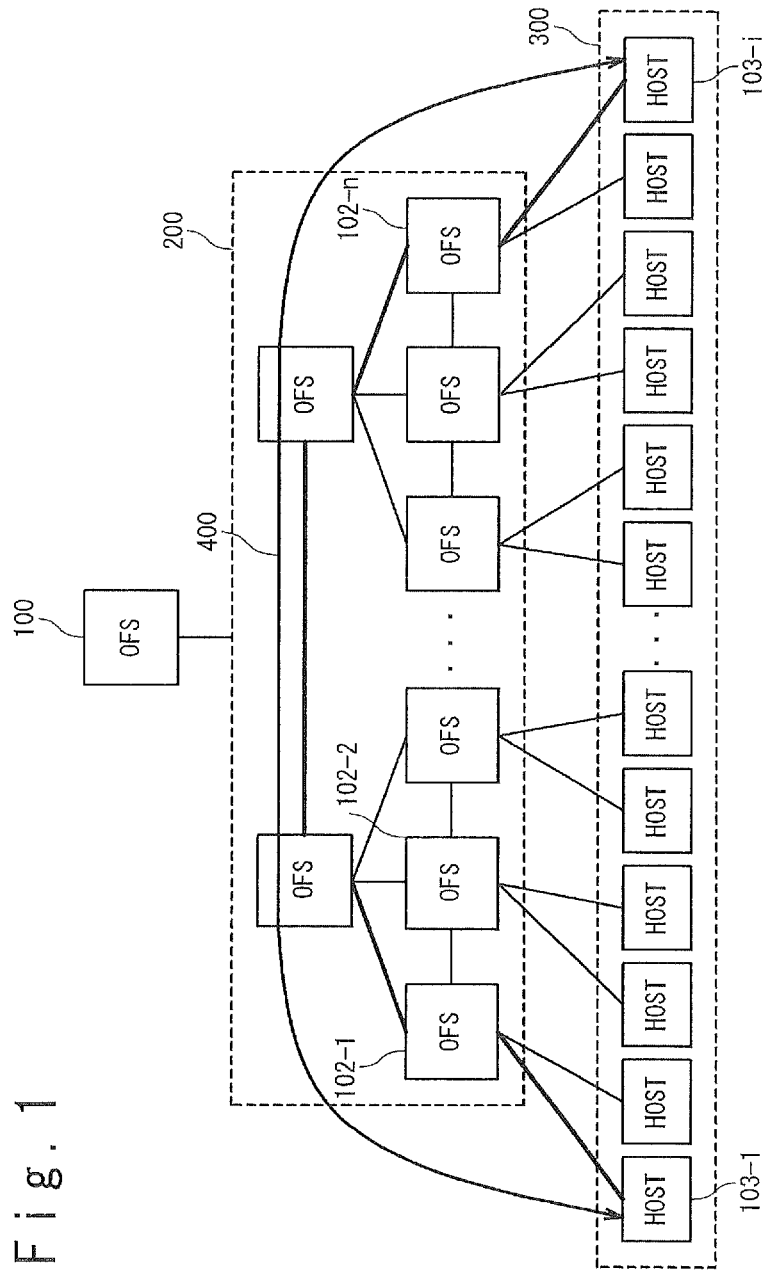
FIG. 1 is a view showing an example of a configuration of a computer system that uses an openflow protocol.

The computer system according to the present invention establishes a communication route and carries out transfer control of packet data by using the openflow technique, similarly to the system shown in FIG. 1. The computer system in the first exemplary embodiment monitors whether address spoofing of an ARP request packet or IP packet is present, on the basis of the first packet transmitted to an openflow controller 2 from an openflow virtual switch 33 which works on a virtual server 3.

Figure 2:
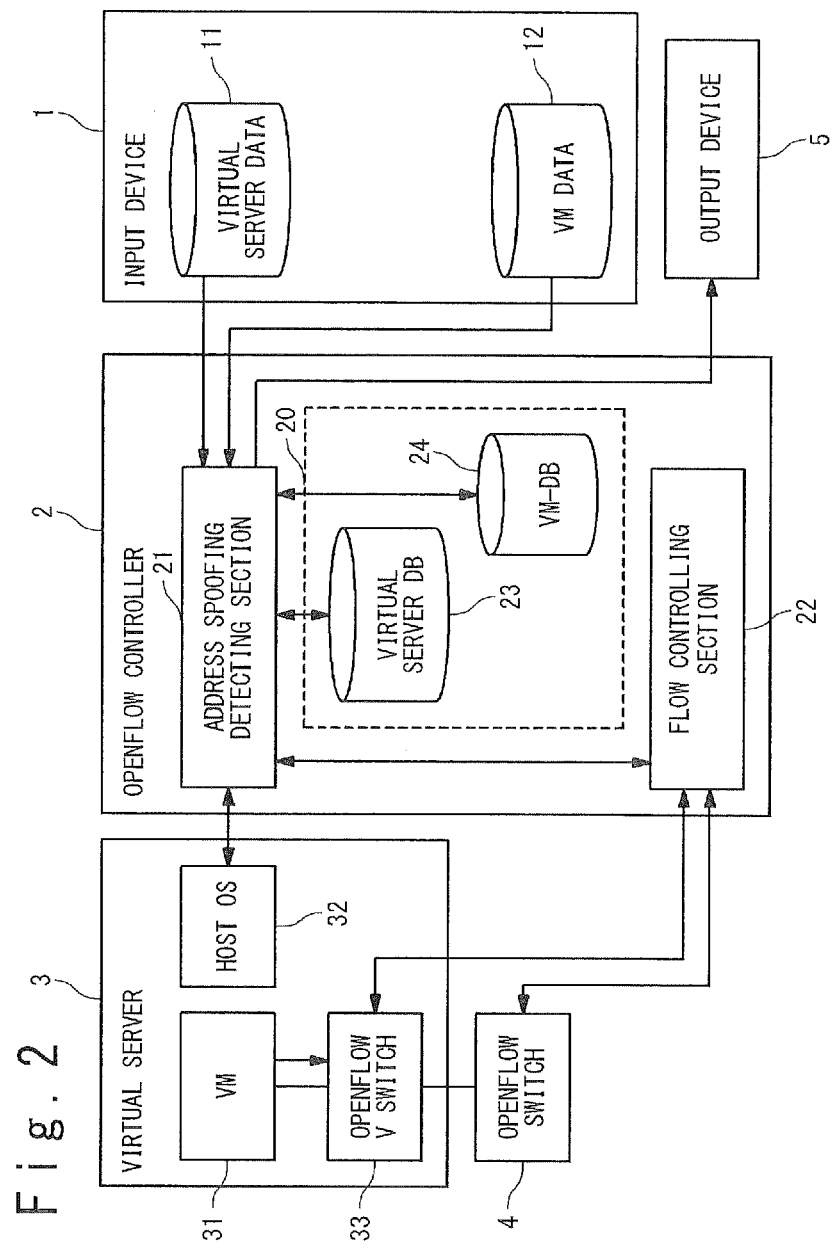
FIG. 2 is a view showing a configuration of a computer system in a first exemplary embodiment according to the present invention.

FIG. 2 is a view showing a configuration of the computer system in the first exemplary embodiment according to the present invention. With reference to FIG. 2, the configuration of the computer system in the first exemplary embodiment according to the present invention will be described.

With reference to FIG. 2, the computer system in the first exemplary embodiment includes an input device 1, an openflow controller 2 (hereinafter, referred to as an OFC 2), a virtual server 3, an openflow switch (hereinafter, referred to as an OFS 4) and an output device 5.

The input device 1 in the first exemplary embodiment includes a storage device which records virtual server data 11 and virtual machine data 12 (VM data 12), which are used to verify access spoofing. The virtual server data 11 is the data required for the OFC 2 to access the virtual server 3.

Figure 3:
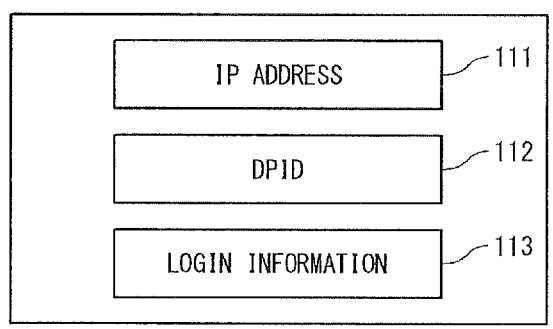
FIG. 3 is a view showing an example of a structure of virtual server data used in address spoofing verification in the first exemplary embodiment.

FIG. 3 is a view showing one example of the structure of the virtual server data 11 used for the address spoofing verification in the first exemplary embodiment. With reference to FIG. 3, the virtual server data 11 includes: an IP address 111 assigned to the legal virtual server 3 that is allowed to connect to the system; a DPID 112 (Data Path ID) of the openflow virtual switch 33 to which a physical network interface of the virtual server 3 is connected; and login information 113 to access the virtual server 3. Each of the IP address 111, the DPID 112 and the login information 113 is correlated with each virtual server 3 and recorded as the virtual server data 11 in the input device 1. Here, the DPID 112 is the number assigned to each of the OFS 4 and the openflow virtual switch 33 (hereinafter, referred to as OFVS 33) in order to uniquely identify the OFS 4 and the OFVS 33. Also, the login information 113 includes ID and password information to access (log in) the virtual server 3.

Figure 4:
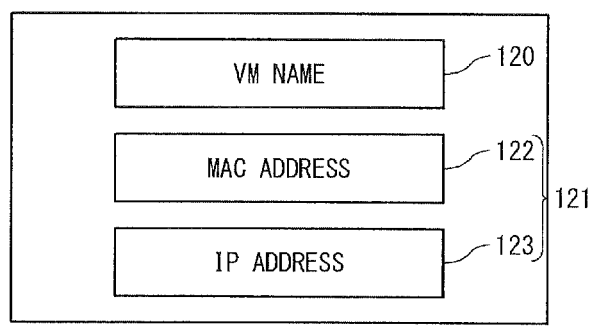
FIG. 4 is a view showing an example of a structure of virtual machine data (VM data) used in the address spoofing verification in the first and second exemplary embodiments.

FIG. 4 is a view showing one example of the structure of the VM data 12 used for the address spoofing verification in the first exemplary embodiment. The VM data 12 is the information to specify a virtual machine 31 existing on the network that is managed by the openflow controller 2. With reference to FIG. 4, the VM data 12 includes a VM name 120 for uniquely identifying the virtual machine 31 and interface information 121 for uniquely specifying the network interface possessed by the virtual machine 31. The VM name 120 and the interface information 121 are correlated with each virtual machine 31 and recorded as the VM data 12 in the input device 1. Here, as the VM name 120, for example, an UUID (Universal Unique Identifier) set to the virtual machine 31 is preferable. Also, the interface information 121 includes a MAC address 122 and an IP address 123, which are assigned to the physical network interface of the virtual machine 31.

The virtual server data 11 and the VM data 12 that are recorded in the input device 1 may be set or updated in advance by a user or may be set or updated on the basis of data obtained by the OFC 2.

The OFC 2 controls establishment of a communication route for a packet transfer and a packet transfer process in the system, on the basis of the openflow technique. Here, the openflow technique indicates the technique for setting a multilayer and route information for each flow to the OFS 4 and OFVS 33 on the communication route and carrying out a route control and a node control (for the detailed information, refer to the non-patent literature 1) according to the rooting policy (flow entry: flow+action). Consequently, a route control function is separated from a router and a switch. Thus, the optimal routing and traffic management can be carried out by the centralized control of a controller. The OFS 4 and OFVS 33 to which the openflow technique is applied treat the communication as the flow of END2END and not as the flow for each packet or frame such as the conventional router and switch.

With reference to FIG. 2, the configuration of the OFC 2 in the first exemplary embodiment will be described in detail. The OFC 2 is preferred to be attained by a computer that includes a CPU and a storage device. In the OFC 2, since the CPU (that is not shown) executes a program stored in the storage device, respective functions of an address spoofing detecting section 21 and a flow controlling section 22 are attained as shown in FIG. 2. The address spoofing detecting section 21 converts each of the virtual server data 11 and the VM data 12, which are supplied by the input device 1, into a format that can be easily retrieved, and records as a virtual server database 23 and a VM database 24, in an address spoofing verification database 20.

The flow controlling section 22 sets or deletes a flow entry (rule+action) to or from the switch (here, the OFS 4 or OFVS 33) based on the openflow protocol. Consequently, the OFS 4 or the OFVS 33 executes an action (for example, relaying or discarding of packet data) corresponding to a rule based on header information of a received packet.

The rule set to the flow entry defines, for example, combinations of addresses and identifiers from a layer 1 to a layer 4 in an OSI (Open Systems Interconnection) reference model, which are included in header information in packet data of TCP/IP. For example, the respective combinations of a physical port of the layer 1, a MAC address of the layer 2, an IP address of the layer 3, a port number of the layer 4, and a VLAN tag (VLAN id) are set as the rule. Incidentally, a priority order (VLAN Priority) may be assigned to the VLAN tag.

Here, the addresses and the identifiers like the port number and so on set as the rule by the flow controlling section 22 may be set within a predetermined range. Also, a destination address, a transmission source address and the like are preferred to be distinguished and set as the rule. For example, the range of a MAC destination address, the range of a destination port number to specify an application of a connection destination, and the range of a transmission source port number to specify an application of a connection source are set as the rule. Moreover, the identifier to specify a data transfer protocol may be set as the rule.

For the action set in the flow entry, for example, a method of treating packet data of TCP/IP is defined. For example, information to indicate whether or not received packet data is relayed, and its transmission destination if the received packet data is relayed are set. Also, as the action, information gives instructions of copying or discarding of packet data may be set.

The flow controlling section 22, when receiving notification of the first packet from the OFS 4 or OFVS 33, inquires of the address spoofing detecting section 21 whether the packet transfer is allowable and sets the flow entry or discards the first packet, in accordance with the inquiry result.

Figure 5A:
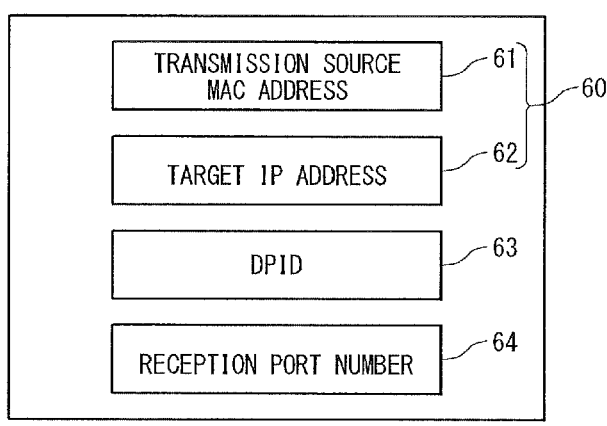
FIG. 5A is a view showing an example of a structure of verification information used in the address spoofing verification in the first exemplary embodiment.
Figure 5B:
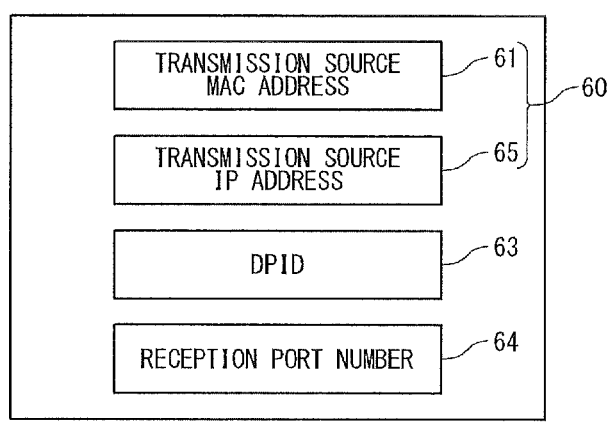
FIG. 5B is a view showing another example of the structure of the verification information used in the address spoofing verification in the first exemplary embodiment.

In detail, at first, the flow controlling section 22 obtains verification information 6 shown in FIG. 5A or 5B, via the notification of the first packet (hereinafter, referred to as PacketIN) from the OFS 4 or OFVS 33. The verification information 6 includes transmission source address information 60 of the first packet, an identifier of a notification source switch (for example, a DPID 63), and a port name of the notification source switch (a reception port number 64). With reference to FIG. 5A, when the notified first packet is the Gratuitous ARP packet, the transmission source address information 60 includes a transmission source MAC address 61 and a target IP address 62. Or, with reference to FIG. 5B, when the notified first packet is the IP packet, the transmission source address information 60 includes the transmission source MAC address 61 and a transmission source IP address 65.

The flow controlling section 22 transmits the verification information 6 to the address spoofing detecting section 21 and inquires whether the packet transfer is allowable. As the result of this inquiry, if the packet transfer is judged to be allowable, the flow controlling section 22 determines a communication route from the header information of the first packet. Then, the flow controlling section 22 sets a flow entry, which is used for transferring a packet coincident with the header information to the communication route, to the OFS 4 and OFVS 33 on the communication route. On the other hand, if the packet transfer is judged to be disallowable in the address spoofing detecting section 21, the first packet of the inquiry target is discarded. At this time, the flow controlling section 22 is preferred to set a flow entry, which is used for discarding a packet coincident with the header information of the first packet, to the notification source switch of the first packet.

Also, the flow controlling section 22 analyzes the first packet notified by the OFS 4 or OFVS 33. Then, only if the packet is the ARP packet, the flow controlling section 22 executes the above inquiring of the address spoofing detecting section 21, and the inquiring about the PacketIN other than the ARP packet may be omitted. In this case, the OFC 2 monitors only the ARP. However, the number of the inquiries made to the address spoofing detecting section 21 and the load on the address spoofing detecting process are reduced.

Incidentally, the setting of the communication route in the flow controlling section 22 and the setting and management of the flow entry are carried out in accordance with the openflow protocol described in the non-patent literature 1. Thus, their detailed explanations are omitted here.

The address spoofing detecting section 21 uses the verification information 6 transmitted by the flow controlling section 22 and the information recorded in the verifying database 20 and carries out the address spoofing verification.

In detail, the address spoofing detecting section 21 obtains the verification information 6 together with an asynchronously-generated event from the flow controlling section 22. The address spoofing detecting section 21 uses the received transmission source address information 60 (the combination of the MAC address and the IP address) as a retrieval key, retrieves the VM database 24 and then obtains the VM name 120 (UUID of the virtual machine 31) corresponding to the interface information 121 coincident with the retrieval key (MAC Address•IP Address Verification). Consequently, the address spoofing detecting section 21 specifies the virtual machine 31 corresponding to the received transmission source address information 60. If the address spoofing detecting section 21 cannot specify the virtual machine 31 corresponding to the received transmission source address information 60 as the result of the retrieval of the VM database 24, namely, if the interface information (the MAC address 122 and the IP address 123) coincident with the combination of the transmission source MAC address 61 and the target IP address 62 (the transmission source IP address 65) does not exist in the VM database 24, the address is judged to be spoofed. The address spoofing detecting section 21, which judges that the address is spoofed, instructs the flow controlling section 22 to discard the packet coincident with the header information of the first packet, which is judged to be the address spoofing, without allowing the packet transfer.

Also, the address spoofing detecting section 21 uses the DPID 63 of the received notification source switch as a retrieval key, retrieves the virtual server database 23 and then obtains the IP address 111 and the login information 113 (for example, the password information) corresponding to the DPID 112 coincident with the retrieval key. Consequently, the address spoofing detecting section 21 can specify a host OS 32 corresponding to the received DPID 63 and also obtain information to access (log in) the host OS 32.

The address spoofing detecting section 21 accesses the host OS 32 in the virtual server 3 by using the IP address 111 and the login information 113, which are obtained from the virtual server database 23, and then obtains the information (hereinafter, referred to as transmission source information 7) with regard to the virtual machine 31, which coincides with the VM name 120 obtained from the VM database 24. For example, the address spoofing detecting section 21 obtains the transmission source information 7 shown in FIG. 6.

Figure 6:
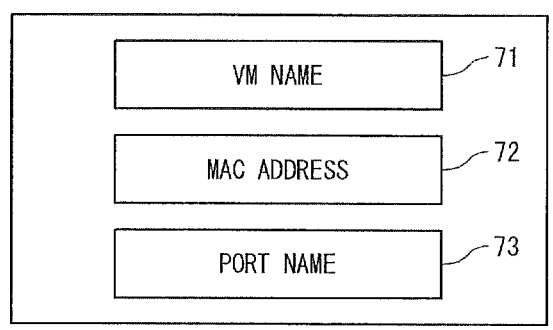
FIG. 6 is a view showing an example of a structure of transmission source information, which an openflow controller obtains from a host OS in the address spoofing verification in the first and second exemplary embodiments.

With reference to FIG. 6, the transmission source information 7 includes: a list of a VM name 71 (for example, UUID) to identify the virtual machine 31 specified by the address spoofing detecting section 21; a MAC address 72 of an interface used by the virtual machine 31; and a list of a port name 73 (port number) of the OFVS 33 to which the interface is connected.

The address spoofing detecting section 21 verifies whether a MAC address coincident with the transmission source MAC address 61 received from the flow controlling section 22 exists in the MAC address 72 of the virtual machine 31 that is obtained from the virtual server 3 (MAC Address Verification). The address spoofing detecting section 21 determines whether transfer of the packet coincident with the header information of the notified first packet is allowable, on the basis of the result of the MAC address verification, and instructs the flow controlling section 22. For example, if the MAC address coincident with the transmission source MAC address 61 is not included in the transmission source information 7, the address spoofing detecting section 21 judges the notified first packet as the illegal access whose address is spoofed. In this case, the address spoofing detecting section 21 does not allow transfer of a packet coincident with the header information of the first packet and instructs to discard the packet. On the other hand, if there is the MAC address 72 coincident with the transmission source MAC address 61, the address spoofing detecting section 21 judges that there is no address spoofing and instructs the flow controlling section 22 to set a flow entry for transferring a packet coincident with the header information of the notified first packet.

Also, if the address spoofing detecting section 21 cannot obtain the MAC address 72 of the interface, which is used by the virtual machine 31, from the virtual machine 31 specified in the retrieval of the VM database 24, the address spoofing detecting section 21 judges that the address is spoofed. The address spoofing detecting section 21 does not allow transfer of a packet coincident with the header information of the first packet that is judged to be the address spoofing, and instructs the flow controlling section 22 to discard the packet.

The output device 5 is exemplified as a monitor or a printer and visibly outputs information (for example, a VM name, MAC address or IP address of a VM which performs spoofing) to specify a virtual machine that spoofs a MAC address or IP address. Also, when the address spoofing detecting section 21 obtains the port name 73 of the virtual machine which performs spoofing, the output device 5 is preferred to visibly output the port name 73. Consequently, it is possible to specify which port of which switch the illegal packet with the spoofed IP address and/or MAC address has invaded from.

The virtual server 3 is a computer apparatus (physical server) including a CPU and RAM which are not shown, and attains at least one virtual machine 31 and OFVS 33 by executing a program stored in a storage device that is not shown. The virtual machine 31 and the OFVS 33 are attained by, for example, a guest operation system ((GOS) that is not shown) which is emulated on the host operation system (host OS 32) or software operating on the GOS. The virtual machine 31 is managed by a virtual machine monitor (VMM) operating on the host OS 32. Here, this is described under an assumption that the virtual machine 31 is managed by the host OS 32.

The virtual machine 31 functions as a host terminal, which carries out a communication with a different host terminal (for example, the virtual machine 31 in a different virtual server 3 or a network device that is not shown) through the OFVS 33. The OFVS 33 is operated in accordance with the openflow protocol and determines a processing method (action) of a packet received from the virtual machine 31, in accordance with a flow entry set (updated) by the OFC 2. As the action for the received packet, there are, for example, transferring the received packet to the OFS 4 and discarding the received packet. Here, the OFVS serves as a switch for firstly receiving a packet transmitted from the virtual machine 31. That is, the OFVS 33 corresponds to an entrance to this system, with regard to the virtual machine 31 serving as a host terminal.

In FIG. 2, only one virtual server 3 is provided in the system. However, the number of the virtual servers 3 is not limited to 1, and a plurality of virtual servers 3 is provided. Also, in the virtual server 3, a plurality of virtual machines 31 and OFVSs 33 may be provided. The plurality of virtual servers 3 (OFVSs 33) provided in the system are connected through the OFS 4 that is operated in accordance with the openflow protocol.

The OFS 4 determines a processing method (action) of a received packet in accordance with a flow entry set (updated) by the OFC 2. As the action for the received packet, there are, for example, transferring the received packet to the different OFS 4 or OFVS 33 and discarding the received packet.

The setting of the flow entry for the OFVS 33 or OFS 4 is carried out in accordance with a Flow-mod request from the OFC 2 as mentioned above. The OFVS 33 or OFS 4, when receiving a packet having the header information that does not comply (or coincide) with the rule of the flow entry set to itself, notifies the OFC 2 of the packet as the first packet (PacketIN). At this time, the OFVS 33 or OFS 4 transmits an identifier (for example, DPID) for identifying the port number receiving the packet or itself, together with the first packet or the header information of the first packet, to the OFC 2. Consequently, the OFVS 33 or OFS 4 transmits the verification information 6 to the OFC 2.

With the above configuration, in the computer system in the first exemplary embodiment, illegal access in which a MAC address and/or IP address of a transmission source is spoofed is verified by the OFC 2, and when a false evidence is detected, a flow entry in which transfer of a packet is not allowed (or discarded) is set to the switch. Thus, it is possible to prevent the illegal access from being performed.

(Network Monitoring Operation)

Figure 7:
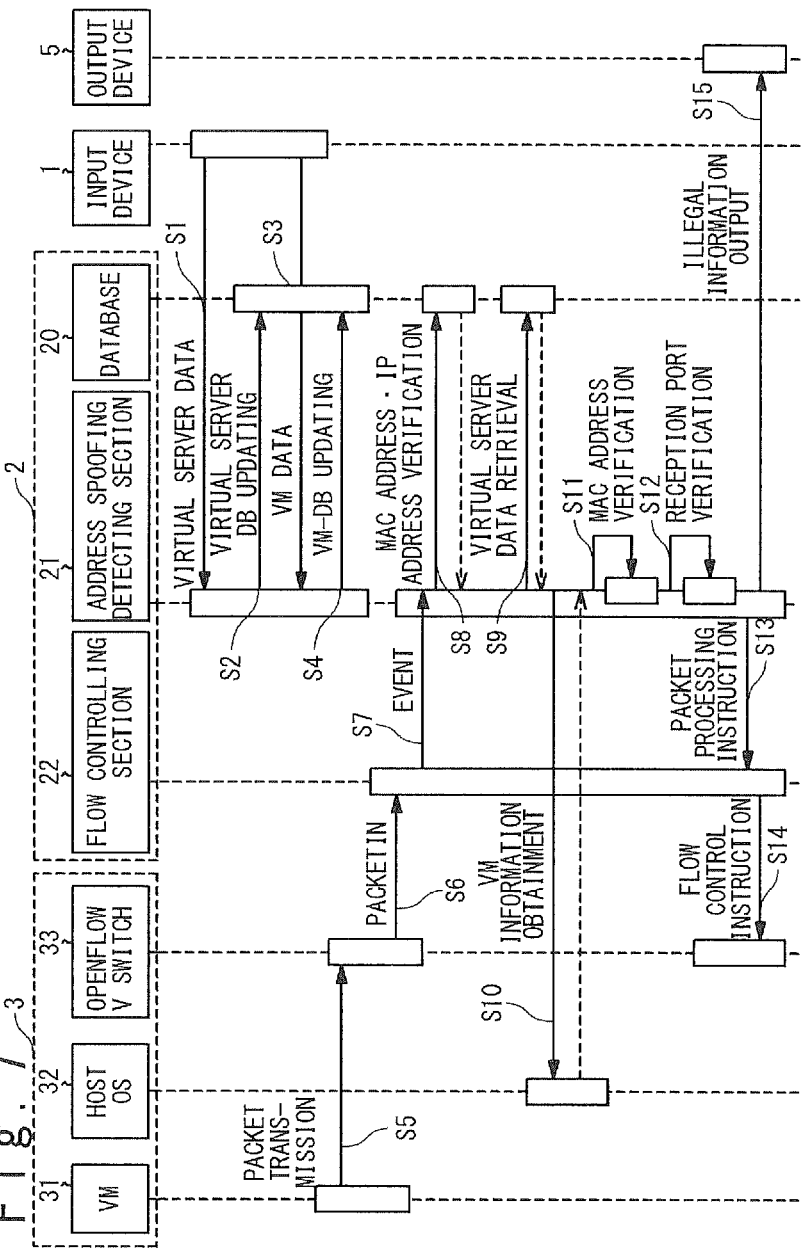
FIG. 7 is a sequence diagram showing an example of a network monitoring operation in the first exemplary embodiment.

With reference to FIG. 7, a network monitoring operation in the first exemplary embodiment will be described below in detail.

FIG. 7 is a sequence diagram showing one example of the network monitoring operation in the first exemplary embodiment. Here, the network monitoring operation when a packet is transferred from the virtual machine 31 to the system will be described.

With reference to FIG. 7, at first, when the computer system is activated, the virtual server data 11 and the VM data 12 are recorded in advance from the input device 1 to the address spoofing verification database 20 in the OFC 2 (Steps S1 to S4). In detail, the virtual server data 11 given by the input device 1 is supplied to the address spoofing detecting section 21 and stored in the virtual server database 23 (Steps S1 and S2). Thus, the virtual server database 23 is updated on the basis of the newest virtual server data 11. Also, the VM data 12 given by the VM data 12 is supplied to the address spoofing detecting section 21 and stored in the VM database 24 (Steps S3 and S4). Consequently, the VM database 24 is updated on the basis of the newest VM data 12. Here, the virtual server database 23 and the VM database 24 can be always retrieved by the address spoofing detecting section 21. Also, the virtual server database 23 and the VM database 24 may be updated during an operation of the system. The updating order is not limited to the order shown in FIG. 7.

In succession, the network monitoring operation when a packet is transferred from the virtual machine 31 to the system is described. The virtual machine 31 transmits a Gratuitous ARP packet or an IP packet (Step S5). At this time, the packet from the virtual machine 31 is transferred through the OFVS 33 to outside the virtual server 3. That is, the OFVS 33 serves as the entrance to the network for the packet.

The OFVS 33 judges whether header information of the Gratuitous ARP packet or IP packet received from a virtual port, to which the virtual machine 31 is connected, complies (coincides) with a rule of the flow entry set to itself. If there is a complying rule, the received packet is treated in accordance with the action corresponding to the rule (for example, transferring to the OFS 4 or discarding) (which is not shown). On the other hand, if (a rule in) the flow entry complying (coinciding) with the header information of the received packet is not set, the OFVS 33 notifies the flow controlling section 22 in the OFC 2 of the received packet as the first packet (Step S6).

For example, when the virtual machine 31 is activated on the virtual server 3, or when the virtual machine 31 is moved onto the virtual server 3 from a different virtual server (that is not shown), a MAC address and IP address assigned to a physical network interface, to which the virtual machine 31 is connected, become new. For this reason, the Gratuitous ARP packet and IP packet firstly transmitted by the virtual machine 31 after the activation (movement) are judged as the first packet in the OFVS 33, and the PacketIN of the Gratuitous ARP packet and IP packet are done to the flow controlling section 22.

In response to the PacketIN, the OFVS 33 transmits the first packet or the header information of the first packet together with the DPID 63 of the OFVS 33 to the flow controlling section 22.

The flow controlling section 22 to which the PacketIN is done extracts the verification information 6 from the information transmitted from the OFVS 33 together with an asynchronous event and outputs to the address spoofing detecting section 21 (Step S7).

The address spoofing detecting section 21 extracts the transmission source address information 60 from the verification information 6 received together with the asynchronous event and verifies the transmission source address of the first packet by using the VM database 24 (Step S8: MAC Address•IP Address Verification). In detail, the address spoofing detecting section 21 verifies whether the interface information 121 (the MAC address 122 and the IP address 123) coincident with the transmission source address information 60 (the transmission source MAC address 61, the target IP address 62 or the transmission source IP address 65) exists in the VM database 24 (MAC Address•IP Address Verification). Here, if the interface information 121 coincident with the transmission source address information 60 does not exist in the VM database 24, the address spoofing detecting section 21 judges that one or both of the MAC address and the IP address is spoofed, and instructs the flow controlling section 22 to discard the packet (Step S13).

On the other hand, at the step S8, if the interface information 121 coincident with the transmission source address information 60 exists in the VM database 24, the address spoofing detecting section 21 obtains the VM name 120 (UUID) corresponding to the interface information 121. When the VM name 120 (UUID) is specified, the address spoofing detecting section 21 uses the DPID 63 of the OFVS received together with the asynchronous event as a retrieval key and retrieves the IP address 111 and the login information 113 from the virtual server database 23 (Step S9). Here, if there is not the DPID 112 coincident with the DPID 63, the address spoofing detecting section 21 judges that one or both of the MAC address and the IP address is spoofed, and instructs the flow controlling section 22 to discard the packet (Step S13).

On the other hand, at the step S9, if the IP address 111 and the login information 113 corresponding to the DPID 63 are obtained, the address spoofing detecting section 21 logs in the host OS 32 specified by the obtained IP address 111, by using the obtained login information 113. In succession, the address spoofing detecting section 21 obtains information of the virtual machine 31 corresponding to the VM name 120 (UUID) obtained at the step S8 as the transmission source information 7 (Step S10). Here, if the transmission source information 7 corresponding to the specified VM name 120 is not obtained, the address spoofing detecting section 21 judges that one or both of the MAC address and the IP address of the first packet is spoofed and instructs the flow controlling section 22 to discard the packet (Step S13).

On the other hand, if the transmission source information 7 is successfully obtained at the step S10, the address spoofing detecting section 21 firstly retrieves whether the transmission source information 7 includes a MAC address coincident with the transmission source MAC address 61 of the first packet (Step S11: MAC Address Verification). Here, if there is not the MAC address 72 coincident with the transmission source MAC address 61 in the transmission source information 7, the address spoofing detecting section 21 judges that the MAC address of the first packet is spoofed and instructs the flow controlling section 22 to discard the packet (Step S13).

On the other hand, at the step S11, if there is the MAC address 72 coincident with the transmission source MAC address 61 in the transmission source information 7, the address spoofing detecting section 21 verifies whether the port name 73 correlated with the MAC address 72 coincides with the reception port number 64 of the first packet (Step S12: Reception port Verification). Here, if there is not the port name 73 which corresponds to the MAC address 72 retrieved at the step S11 and coincides with the reception port number 64, the address spoofing detecting section 21 judges that one or both of the MAC address and the IP address of the first packet is spoofed and instructs the flow controlling section 22 to discard the packet (Step S13).

On the other hand, if there is the port name 73 which corresponds to the MAC address 72 retrieved at the step S11 and coincides with the reception port number 64, the address spoofing detecting section 21 judges that there is no address spoofing with regard to the first packet, and instructs the flow controlling section 22 to set a flow entry for transferring the packet (Step S13).

At the step S13, the flow controlling section 22, which is instructed to discard the packet, discards the first packet of the PacketIN, and sets a flow entry, in which a part or all of the header information of the packet is used as a rule and packet discarding is used as an action, to the OFVS 33 (Step S14). For example, the flow controlling section 22 sets the flow entry, in which the reception port number of the first packet and the transmission source MAC address are used as the rule and the discarding of the received packet coincident with the rule is used as the action, to the OFVS 33 of the notification source of the first packet. Consequently, after that, in the OFVS 33, when the packet judged as spoofing by the OFC 2 is received, it is discarded without any notification to the OFC 2, and the invasion to the network of the illegal packet can be blocked at the entrance of the network.

On the other hand, at the step S13, the flow controlling section 22, which is instructed to transfer the packet, sets a flow entry, in which a part or all of the header information of the first packet of the PacketIN is used as a rule and packet transferring is used as an action, to the switch (the OFVS 33 or OFS 4) on the communication route (Step S14).

Also, the address spoofing detecting section 21, which judges that the address is spoofed at the steps S8, S9, S10 and S11, outputs the transmission source address information 60 received from the flow controlling section 22 together with the asynchronous event at the step S7 to the output device 5 (Step S15). In this case, the output device 5 visibly outputs the transmission source address information 60 (the transmission source MAC address 61 and the target IP address 62 or the transmission source IP address 65) as the spoofed address. Moreover, the address spoofing detecting section 21, when judging that the address is spoofed, may output the reception port number 64 to the output device 5. In this case, the output device 5 visibly outputs the reception port number 64.

Figure 8:
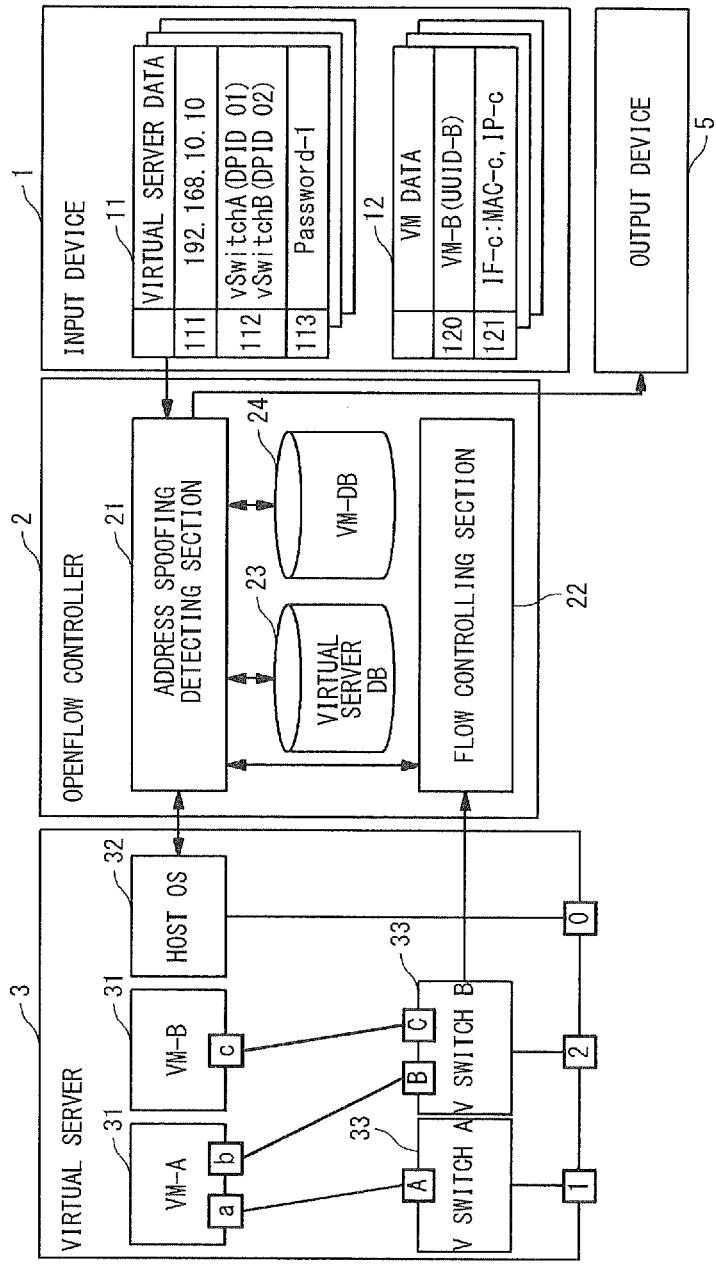
FIG. 8 is a view showing a specific example to describe a configuration and operation of the computer system in the first exemplary embodiment.

With reference to FIG. 8, a specific example of the network monitoring operation in the first exemplary embodiment will be described below. FIG. 8 is a view showing the specific example to describe the configuration and operation of the computer system in the first exemplary embodiment. With reference to FIG. 8, the virtual server database 23 registers, as the virtual server data 11, the IP address 111: "192.168.10.10", the DPID 112: "vSwitchA (DPID 01)", "vSwitchB (DPID 02)" and the login information 113: "Password-1". Also, the VM database 24 registers, as the VM data 12, the VM name 120: "VM-B (UUID-B)" and the interface information 121: "IF-c:MAC-c, IP-c". Also, the virtual server 3 includes: two virtual machines 31: "VM-A" and "VM-B"; and two OFVSs 33: "vSwitchA" and "vSwitchB". The virtual machine 31 "VM-A" has two interfaces "IF-a" and "IF-b", and the virtual machine 31 "VM-B" has one interface "IF-c". The OFVS 33 "vSwitchA" is connected to a port "Port-A", and the OFVS 33 "vSwitchB" is connected to two ports "Port-B" and "Port-C".

The network monitoring operation in the foregoing computer system will be described. When the virtual machine 31 "VM-B" is transferred from a different virtual server and transmits a Gratuitous ARP packet, the OFVS 33 "vSwitchB" receives the packet through the port "Port-C". The OFVS 33 "vSwitchB" does the PacketIN of the received packet as the first packet to the flow controlling section 22.

The flow controlling section 22 notifies the address spoofing detecting section 21 of the verification information 6 together with the asynchronous event in response to the PacketIN. Here, the transmission source MAC address 61: "MAC-c", the target IP address 62: "IP-c", the DPID 63: "DPID 02", and the reception port number 64: "Port-C" are notified as the verification information 6.

The address spoofing detecting section 21 carries out the MAC address•IP address verification by using the notified transmission source MAC address 61 "MAC-c" and target IP address 62 "IP-c". The interface information 121 "MAC-c" and "IP-c", which coincides with the transmission source MAC address 61 "MAC-c" and the target IP address 62 "IP-c", exist in the VM database 24. Thus, in the MAC address•IP address verification, it is judged that there is no spoofed address. Also, the address spoofing detecting section 21 extracts the VM name "VM-B (UUID-B)" corresponding to the interface information 121.

Next, the address spoofing detecting section 21 obtains the IP address 111: "192.168.10.10" and the login information 113: "Password-1", which correspond to the DPID 112 coincident with the DPID 63 "DPID 02" received by the PacketIN, inside the virtual server database 23, and accesses (logs in) the host OS 32 by using them. Consequently, the address spoofing detecting section 21 obtains information with regard to the virtual machine 31 of the VM name "VM-B (UUID-B)" extracted from the VM database 24, as the transmission source information 7, from the host OS 32 of the access destination. Here, the address spoofing detecting section 21 obtains the VM name 71: "VM-B (UUID-B)", the interface name: "IP-c", the MAC address 72: "MAC-c", and the port name 73: "Port-C".

Next, the address spoofing detecting section 21 carries out the MAC address verification. Here, in the obtained transmission source information 7, there is the MAC address 72 "MAC-c", which coincides with the transmission source MAC address 61 "MAC-c" received by the PacketIN. Thus, in the MAC address verification, it is judged that there is no spoofed address. Also, the address spoofing detecting section 21 judges that there is no spoofed address in the reception port verification, because the port name "Port-C" corresponding to the MAC address 72 "MAC-c" coincides with the reception port number "Port-C" corresponding to the transmission source MAC address 61.

The address spoofing detecting section 21, since judging that there is no spoofing as the result of all of the address spoofing verifications, judges that the Gratuitous ARP packet notified as the first packet uses the legal transmission source MAC address and target IP address, and then instructs the flow controlling section 22 to transfer the packet.

In response to the packet transfer instruction from the address spoofing detecting section 21, the flow controlling section 22 sets, for example, a flow entry defining a rule of the transmission source MAC address: "MAC-c" and the target IP address: "IP-c" and an action of "transferring to the OFS 4", to the OFVS 33 "vSwitchA". Consequently, the OFVS 33 "vSwitchA", when receiving the ARP packet complying with the set rule, transfers the packet to the OFS 4.

On the other hand, if it is judged that there is a spoofed address even in one of the foregoing address spoofing verifications, the flow controlling section 22 sets, for example, a flow entry defining a rule of the transmission source MAC address: "MAC-c" and the target IP address: "IP-c" and an action of "discarding of a packet", to the OFVS 33 "vSwitchA", in response to the packet discarding instruction from the address spoofing detecting section 21. Consequently, the OFVS 33 "vSwitchA", when receiving the ARP packet complying with the set rule, discards the packet.

Also, if it is judged that there is a spoofed address even in one of the foregoing address spoofing verifications, the verification information 6 which is supplied together with the asynchronous event to the address spoofing detecting section 21 is visibly outputted by the output device 5.

With the above operations, the system according to the present invention can detect: the Gratuitous ARP packet in which the transmission source MAC address or the target IP address is spoofed; and the IP packet in which the transmission source MAC address or the transmission source IP address is spoofed, and visibly output them. Also, it is possible to specify the MAC address and IP address of the transmission source of the detected address spoofing packet, on the basis of the verification information 6 obtained from the OFVS 33 by the PacketIN. Also, the DPID and reception port number of the OFVS 33 which does the PacketIN can be specified, which can specify the physical position from which the illegal access is tried.

The system according to the present invention uses the openflow protocol. Thus, in the switch (the OFVS 33 in the above example) which is the entrance when the address spoofing packet enters the layer 2 network, it is possible to verify the legitimacy of a combination between the transmission source MAC address and the target IP address (or the transmission source IP address). Hence, the packet judged as the address spoofing can be discarded in the switch. For this reason, before the illegal ARP packet or IP packet invades the network, this can be blocked. As this result, according to the present invention, it is possible to avoid a Gratuitous ARP, in which a target IP address is spoofed, from interrupting a legal user and prevent a packet from being intercepted.

In the system described in the patent literature 1, each time an ARP packet whose address is spoofed is received, rewriting operation of an ARP table based on the received packet and updating operation of the ARP table by a monitoring server are carried out. Thus, communication interruption caused by illegal access cannot be suppressed. On the other hand, in the system according to the present invention, by using the openflow protocol, the OFC 2 can find out a position where the packet received in the switch invades the layer 2 network. For this reason, by comparing the transmission source MAC address of the ARP packet with the MAC address of the virtual machine existing at the above position, the illegal ARP packet that tries to invade the network from a different location can be blocked before it enters the network. As this result, according to the present invention, it is possible to avoid the ARP (in particular, the Gratuitous ARP), which spoofs the transmission source MAC address, from interrupting the legal user.

Moreover, the system according to the present invention verifies the ARP packet or IP packet, which is transmitted by a disallowed outsider, on the basis of the combination of the transmission source MAC address, the transmission source IP address and the reception port of the switch, and carries out the control so that it does not invade the network. For this reason, according to the present invention, the disallowed outsider can be blocked from illegally using an unused IP address and accessing the network.

Moreover, the system according to the present invention can block an excessive traffic that spoofs the MAC address or IP address, especially, a broadcast traffic before it invades the layer 2 network. Thus, the excessive traffic in the network can be reduced.

2. Second Exemplary Embodiment (Configuration of Computer System)

The first exemplary embodiment is described about the exemplary embodiment that includes the OFVS 33 which uses the openflow protocol. However, the present invention is not limited thereto. Even if the virtual switch does not use the openflow protocol, the present invention can be applied to a case in which a switch connected between servers is operated in accordance with the openflow protocol. The computer system in the second exemplary embodiment monitors whether address spoofing of an ARP request packet or IP packet is present on the basis of the first packet that is transmitted to the openflow controller 2 from the openflow switch 4 for connecting a virtual server 3' and a different host terminal. Hereinafter, configurations and operations that differ from those of the first exemplary embodiment will be described in detail, and descriptions of the similar configurations and operations are omitted.

Figure 9:
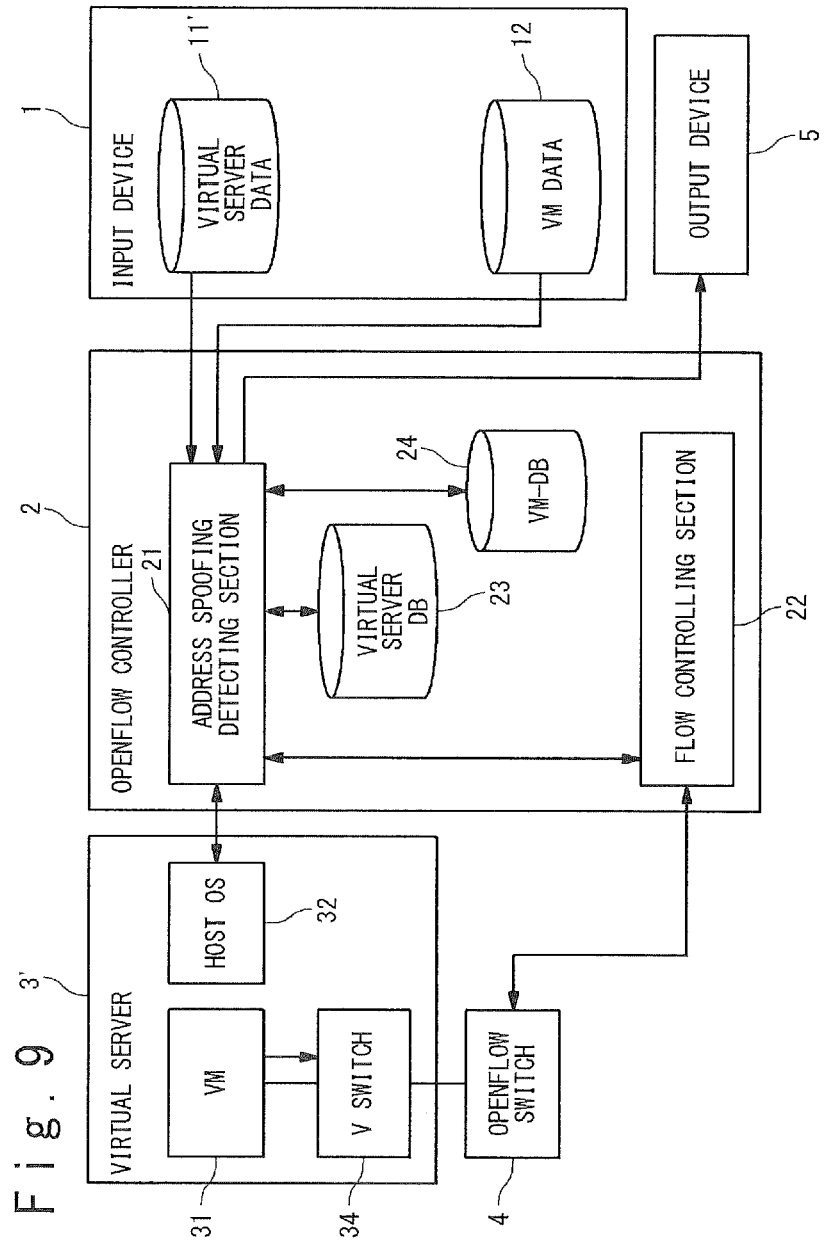
FIG. 9 is a view showing a configuration of a computer system in a second exemplary embodiment according to the present invention.

FIG. 9 is a view showing a configuration in the second exemplary embodiment of the computer system according to the present invention. With reference to FIG. 9, the virtual server 3' in the second exemplary embodiment includes a virtual switch 34 of a layer 2 that is not based on the openflow protocol, instead of the openflow virtual switch 33 in the first exemplary embodiment. For this reason, the PacketIN of the Gratuitous ARP packet transmitted from the virtual machine 31 is done to the flow controlling section 22 from the OFS 4. That is, the OFS 4 in the second exemplary embodiment corresponds to the entrance to this system with respect to the virtual machine 31 serving as the host terminal. Also, the input device 1 in the second exemplary embodiment inputs a virtual server data 11' shown in FIG. 10 to the OFC 2. The configurations other than those configurations are similar to the first exemplary embodiment.

Figure 10:
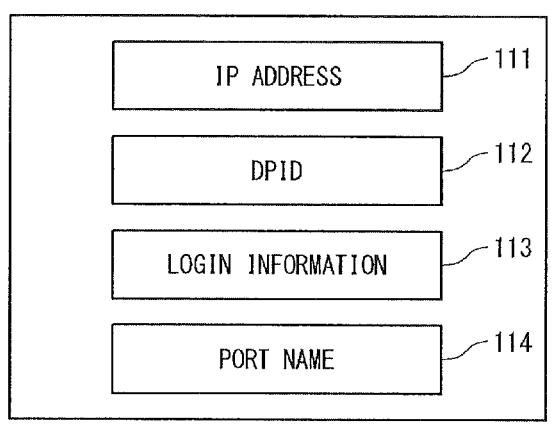
FIG. 10 is a view showing an example of a structure of virtual server data used in the address spoofing verification in the second exemplary embodiment.

FIG. 10 is a view showing one example of the structure of the virtual server data 11' that is used in the address spoofing verification in the second exemplary embodiment. With reference to FIG. 10, the virtual server data 11' includes: an IP address 111 assigned to the virtual server 3', a DPID 112 of the OFS 4 to which a physical network interface of the virtual server 3' is connected, login information 113 to access the virtual server 3' and a port name 114 to which the OFS 4 is connected. Each of the IP address 111, the DPID 112, the login information 113 and the port name 114 is correlated with each virtual server 3' and recorded as the virtual server data 11' in the input device 1.

(Network Monitoring Operation)

Figure 11:
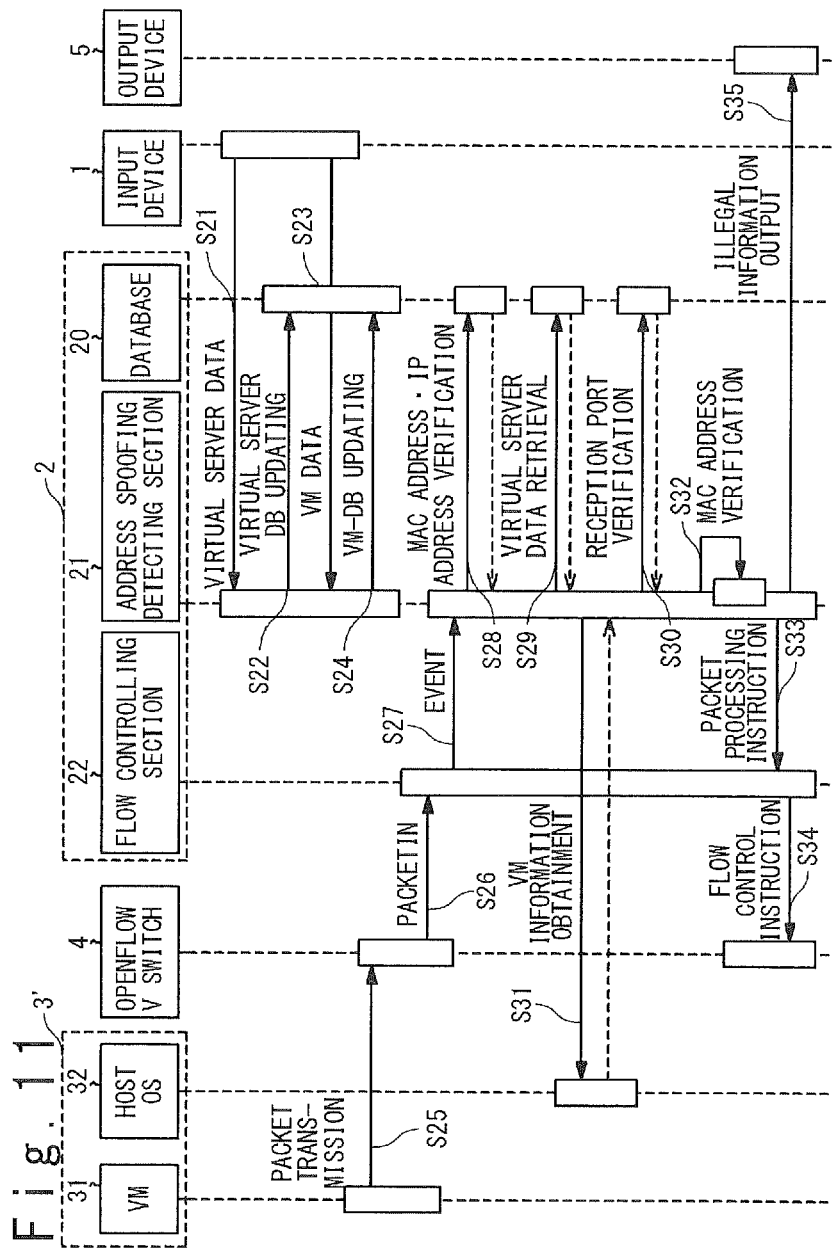
FIG. 11 is a sequence diagram showing an example of a network monitoring operation in the second exemplary embodiment.

With reference to FIG. 11, a network monitoring operation in the second exemplary embodiment will be described in detail.

With reference to FIG. 11, at first, when the computer system is activated, the virtual server data 11' and the VM data 12 are recorded in advance from the input device 1 to the address spoofing verification database 20 in the OFC 2 (Steps S21 to S24). Detailed operations are similar to those of the steps S1 to S4 shown in FIG. 7.

In succession, the network monitoring operation when a packet is transferred from the virtual machine 31 to the system is described. The virtual machine 31 transmits a Gratuitous ARP packet or an IP packet (Step S25). At this time, the packet from the virtual machine 31 is transferred through the virtual switch 34 to the OFS 4 outside the virtual server 3'.

The OFS 4 judges whether header information of the Gratuitous ARP packet or IP packet received from a port connected to the virtual server 3' complies (coincides) with a rule of the flow entry set for itself. If there is a complying rule, the received packet is treated in accordance with the action corresponding to the rule (for example, transferring to the different OFS 4 or discarding) (which is not shown). On the other hand, if (a rule in) the flow entry complying (coinciding) with the header information of the received packet is not set, the OFS 4 notifies the flow controlling section 22 in the OFC 2 of the received packet as the first packet (Step S26). Here, the OFS 4 transmits the first packet or the header information of the first packet together with the DPID 63 of the OFS 4 to the flow controlling section 22, on the basis of the PacketIN.

The flow controlling section 22 to which the PacketIN is done extracts the verification information 6 from the information transmitted from the OFS 4 together with an asynchronous event and outputs to the address spoofing detecting section 21 (Step S27).

The address spoofing detecting section 21 verifies, similarly to the step S8 shown in FIG. 7, the transmission source address of the first packet by using the virtual server DB 23 and (Step S28: MAC Address•IP Address Verification). Here, if the DPID 112 coincident with the DPID 63 does not exist, the address spoofing detecting section 21 judges that one or both of the MAC address and the IP address of the first packet is spoofed, and instructs the flow controlling section 22 to discard the packet (Step S33).

On the other hand, at the step S28, if the interface information 121 coincident with the transmission source address information 60 exists in the VM database, the address spoofing detecting section 21 obtains the VM name 120 (UUID) corresponding to the interface information 121. When the VM name 120 (UUID) is specified, the address spoofing detecting section 21 uses the DPID 63 of the OFS received together with the asynchronous event as a retrieval key and retrieves the IP address 111, the login information 113 and the port name 114 from the virtual server database 23 (Step S29). Here, if there is not the DPID 112 coincident with the DPID 63, the address spoofing detecting section 21 judges that one or both of the MAC address and the IP address is spoofed, and instructs the flow controlling section 22 to discard the packet (Step S33).

At the step S29, if the IP address 111, the login information 113 and the port name 114 corresponding to the DPID 63 are obtained, the address spoofing detecting section 21 compares the port name 114 obtained from the virtual server database 23 and the reception port number 64 received from the flow controlling section 22 (Step S30: Reception port Verification). At the step S30, if the port name 114 does not coincide with the reception port number 64, the address spoofing detecting section 21 judges that the reception port name is spoofed and instructs the flow controlling section 22 to discard the packet (Step S33).

On the other hand, at the step S30, if the port name 114 coincides with the reception port number 64, the address spoofing detecting section 21 logs in the host OS 32, which is specified on the basis of the IP address 111 obtained at the step S29, by using the obtained login information 113. In succession, the address spoofing detecting section 21 obtains information of the virtual machine 31 corresponding to the VM name 120 (UUID) obtained at the step S28 as the transmission source information 7 (Step S31). Here, if the transmission source information 7 corresponding to the specified VM name 120 is not obtained, the address spoofing detecting section 21 judges that one or both of the MAC address and the IP address of the first packet is spoofed and instructs the flow controlling section 22 to discard the packet (Step S33). Incidentally, the transmission source information 7 obtained in the second exemplary embodiment may not include the port name 73.

On the other hand, if the transmission source information 7 is successfully obtained at the step S31, the address spoofing detecting section 21 retrieves whether the transmission source information 7 includes a MAC address coincident with the transmission source MAC address 61 of the first packet (Step S32: MAC Address Verification). Here, if there is not the MAC address 72 coincident with the transmission source MAC address 61 in the transmission source information 7, the address spoofing detecting section 21 judges that the MAC address of the first packet is spoofed and instructs the flow controlling section 22 to discard the packet (Step S33).

On the other hand, at the step S32, if there is the MAC address 72 coincident with the transmission source MAC address 61 in the transmission source information 7, the address spoofing detecting section 21 judges that there is no address spoofing with regard to the first packet, and instructs the flow controlling section 22 to set a flow entry for transferring the packet (Step S33).

At the step S33, the flow controlling section 22, which is instructed to discard the packet, discards the first packet of the PacketIN, and sets a flow entry, in which a part or all of the header information of the packet is used as a rule and packet discarding is used as an action, to the OFS 4 (Step S34). Consequently, if the OFS 4 receives the packet which is judged once whether it is spoofed, the packet is discarded without any notification to the OFC 2, and the invasion to the network of the illegal packet can be blocked at the entrance of the network.

On the other hand, at the step S33, the flow controlling section 22, which is instructed to transfer the packet, sets a flow entry, in which a part or all of the header information of the first packet of the PacketIN is used as a rule and packet transferring is used as an action, to the OFS 4 on the communication route (Step S34).

Also, the address spoofing detecting section 21, which judges that the address is spoofed at the steps S28, S29, S30, S31 and S32, outputs the transmission source address information 60 received from the flow controlling section 22 together with the asynchronous event at the step S27, to the output device 5 (Step S35). In this case, the output device 5 visibly outputs the transmission source address information 60 (the transmission source MAC address 61 and the target IP address 62 or the transmission source IP address 65) as a spoofed address. Moreover, the address spoofing detecting section 21, when judging that the address is spoofed, may output the reception port number 64 to the output device 5. In this case, the output device 5 visibly outputs the reception port number 64.

Figure 12:
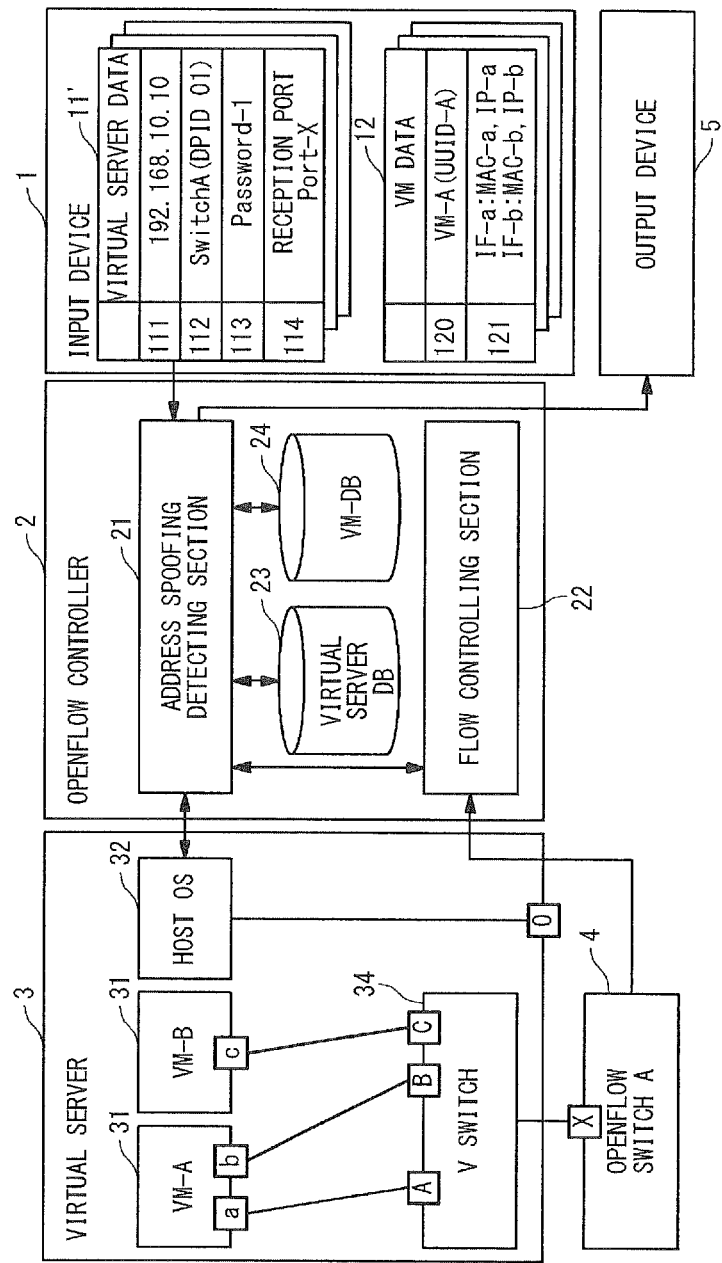
FIG. 12 is a view showing a specific example to describe a configuration and operation of the computer system in the second exemplary embodiment.

With reference to FIG. 12, the specific example of the network monitoring operation in the second exemplary embodiment will be described below. FIG. 12 is a view showing the specific example to describe the configuration and operation of the computer system in the second exemplary embodiment. With reference to FIG. 12, the virtual server database 23 registers, as the virtual server data 11', the IP address 111: "192.168.10.10", the DPID 112: "SwitchA (DPID 01)", the login information 113: "Password-1", and the port name 114: "Port-X". Also, the VM database 24 registers, as the VM data 12, the VM name 120: "VM-A (UUID-A)" and the interface information 121: "IF-a: MAC-a, IP-a", "IF-b: MAC-b, IP-b". Also, the virtual server 3' includes: two virtual machines 31: "VM-A" and "VM-B"; and one virtual switch 34: "vSwitch". The virtual machine 31 "VM-A" has two interfaces "IF-a" and "IF-b", and the virtual machine 31 "VM-B" has one interface "IF-c". The virtual switch "vSwitch" is connected to ports "Port-A, Port-B and Port-C". Moreover, the OFS 4 "OpenFlow SwitchA" is connected through the port "Port-X" to the virtual switch 34 "vSwitch".

The network monitoring operation in the foregoing computer system will be described. When the virtual machine 31 "VM-A" is transferred from a different virtual server and transmits a Gratuitous ARP packet, the packet is transferred from the virtual switch 34 "vSwitchA" through the port "Port-X" to the OFS 4 "OpenFlow SwitchA". The OFS 4 "OpenFlow SwitchA" does the PacketIN of the received packet as the first packet to the flow controlling section 22.

The flow controlling section 22 notifies the address spoofing detecting section 21 of the verification information 6 together with the asynchronous event in response to the PacketIN. Here, the transmission source MAC address 61: "MAC-a", the target IP address 62: "IP-a", the DPID 63: "DPID 01", and the reception port number 64: "Port-X" are notified as the verification information 6.

The address spoofing detecting section 21 carries out the MAC address•IP address verification by using the notified transmission source MAC address 61 "MAC-a" and target IP address 62 "IP-a". The interface information 121 "MAC-a" and "IP-a", which coincide with the transmission source MAC address 61 "MAC-a" and the target IP address 62 "IP-a", exist in the VM database 24. Thus, in the MAC address•IP address verification, it is judged that there is no spoofed address. Also, the address spoofing detecting section 21 extracts the VM name "VM-A (UUID-A)" corresponding to the interface information 121.

Next, the address spoofing detecting section 21 carries out the reception port verification. Here, the reception port number 64: "Port-X" received by the PacketIN coincides with the port name 114 "Port-X" registered in the virtual server database 23. Thus, in the reception port verification, it is judged that there is no spoofed address.

Next, the address spoofing detecting section 21 obtains the IP address 111: "192.168.10.10" and the login information 113: "Pasword-1", which correspond to the DPID 112 coincident with the DPID 63 "DPID 01" received by the PacketIN, inside the virtual server database 23, and accesses (logs in) the host OS 32 by using them. Consequently, the address spoofing detecting section 21 obtains information with regard to the virtual machine 31 of the VM name "VM-A (UUID-A)" extracted from the VM database 24, as the transmission source information 7, from the host OS 32 of the access destination. Here, the address spoofing detecting section 21 obtains the interface name: "IF-a", the MAC address 72:

"MAC-a", the interface name: "IF-b", and the MAC address 72: "MAC-b" correlated with the VM name 71: "VM-A (UUID-A)".

Next, the address spoofing detecting section 21 carries out the MAC address verification. Here, inside the obtained transmission source information 7, there is the MAC address 72 "MAC-a", which coincides with the transmission source MAC address 61 "MAC-a" received by the PacketIN. Thus, in the MAC address verification, it is judged that there is no spoofed address.

The address spoofing detecting section 21 judges, since judging that there is no spoofing as the result of all of the address spoofing verifications, that the Gratuitous ARP packet notified as the first packet uses the legal transmission source MAC address and target IP address, and then instructs the flow controlling section 22 to transfer the packet.

In response to the packet transfer instruction from the address spoofing detecting section 21, the flow controlling section 22 sets, for example, a flow entry defining a rule of the transmission source MAC address: "MAC-a" and the target IP address: "IP-a" and an action of "transferring to the different OFS 4", to the OFS 4 "OpenFlow SwitchA". Consequently, the OFS 4 "OpenFlow SwitchA", when receiving the ARP packet complying with the set rule, transfers the packet to the specified different OFS 4.

On the other hand, if it is judged that there is a spoofed address even in one of the foregoing address spoofing verifications, the flow controlling section 22 sets, for example, a flow entry defining a rule of the transmission source MAC address: "MAC-a" and the target IP address: "IP-a" and an action of "discarding of a packet", to the OFS 4 "OpenFlow SwitchA", in response to the packet discarding instruction from the address spoofing detecting section 21. Consequently, the OFS 4 "OpenFlow SwitchA", when receiving the ARP packet complying with the set rule, discards the packet.

Also, if it is judged that there is a spoofed address even in one of the foregoing address spoofing verifications, the verification information 6 which is supplied together with the asynchronous event to the address spoofing detecting section 21 is visibly outputted by the output device 5.

As mentioned above, according to the computer system in the second exemplary embodiment, even if the virtual switch does not use the openflow protocol, by operating the switch serving as the entrance of the layer 2 network in accordance with the openflow protocol, it is possible to block the address spoofing packet in the switch. In the first exemplary embodiment, the port number (reception port number) to which the virtual switch is connected is obtained from the host OS, and the spoofing is verified. However, in the second exemplary embodiment, since the notification source of the first packet is the physical switch, the spoofing of the reception port can be verified by using a pre-registered port name. Also, the other effects of the computer system according to the second exemplary embodiment are similar to the first exemplary embodiment.

3. Third Exemplary Embodiment
(Configuration of Computer System)

The first and second exemplary embodiments are described about the system for monitoring the communication between the virtual servers. However, the present invention is not limited thereto. The present invention can be applied to communication monitoring between network devices connected to each other through an openflow switch. The computer system in the third exemplary embodiment monitors whether address spoofing of an ARP request packet or IP packet is present on the basis of the first packet transmitted to the openflow controller 2 from the openflow switch 4 connected between network devices 30. Hereinafter, configurations and operations that differ from those of the first exemplary embodiment will be described in detail, and descriptions of the similar configurations and operations are omitted.

Figure 13:
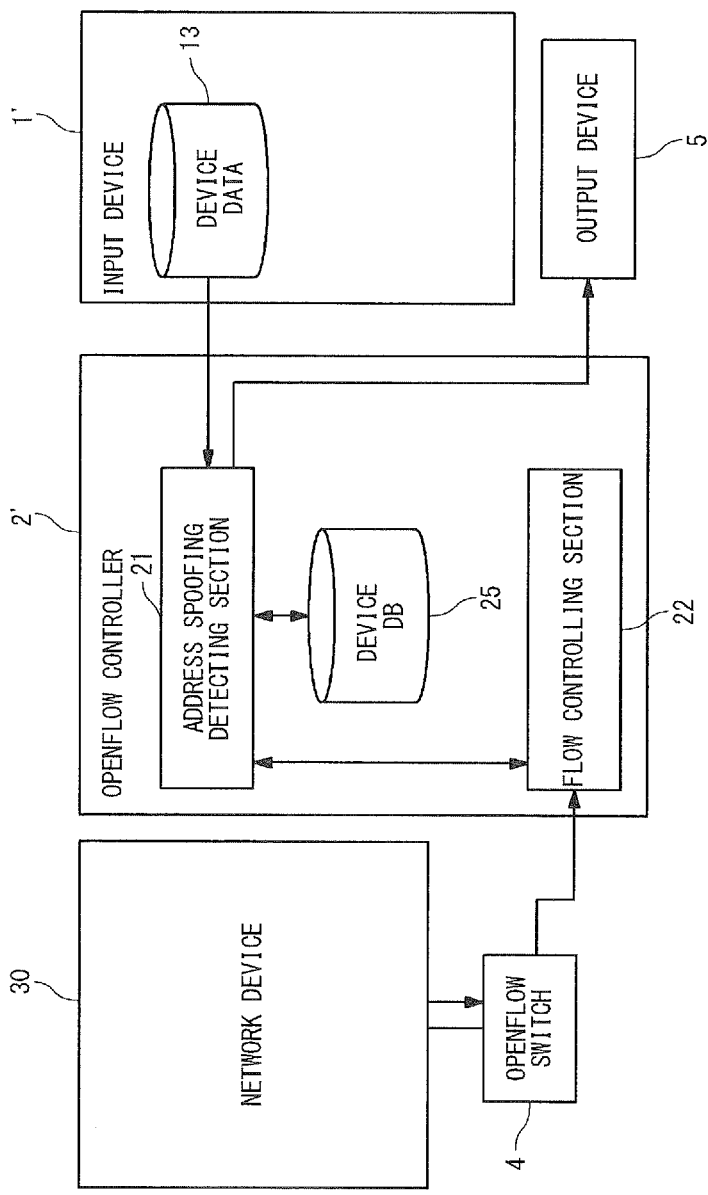
FIG. 13 is a view showing a configuration of a computer system in a third exemplary embodiment according to the present invention.

FIG. 13 is a view showing a configuration in the third exemplary embodiment of the computer system according to the present invention. With reference to FIG. 13, the computer system in the third exemplary embodiment includes a network device 30, instead of the virtual server 3 in the first exemplary embodiment. That is, the first and second exemplary embodiments are described using the virtual server as the host terminal configuring the network, as one example. In the present exemplary embodiment, the computer system in which the network device is used as the host terminal will be described. Here, the network device 30 indicates any terminal which carries out the TCP/IP communication such as a computer, a network printer and so on. In the system in the third exemplary embodiment, the PacketIN of the Gratuitous ARP packet and the IP packet transmitted from the network device 30 is done to the flow controlling section 22 from the OFS 4. Here, the OFS 4 is the switch that firstly receives the packet transmitted from the network device 30. That is, the OFS 4 corresponds to the entrance to this system with respect to the network device 30 serving as the host terminal. Also, an input device 1' in the third exemplary embodiment inputs device data 13 shown in FIG. 14 to the OFC 2'. Moreover, the OFC 2' in the third exemplary embodiment includes a device database 25, instead of the virtual server database 23 and the VM database 24 in the first exemplary embodiment. The configurations other than those configurations are similar to the first exemplary embodiment.

Figure 14:
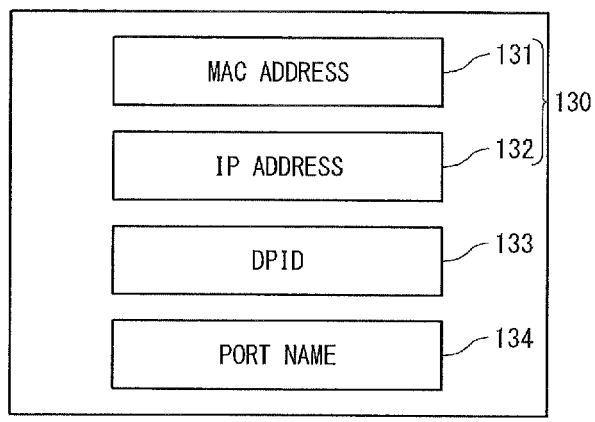
FIG. 14 is a view showing an example of a structure of device data used in the address spoofing verification in the third exemplary embodiment.

FIG. 14 is a view showing one example of the structure of the device data 13 that is used in the address spoofing verification in the third exemplary embodiment. With reference to FIG. 14, the device data 13 includes: a MAC address 131 and an IP address 132 (when the two addresses are collectively called, it is referred to as device address information 130) assigned to the legal network device 30 which is allowed to be connected to the system; a DPID 133 of the OFS 4 to which the physical network interface of the network device 30 is connected; and a port name 134 of the OFS 4. Each of the MAC address 131, the IP address 132, the DPID 133 and the port name 134 is correlated with each network device 30 and recorded as the device data 13 in the input device 1'.

(Network Monitoring Operation)

Figure 15:
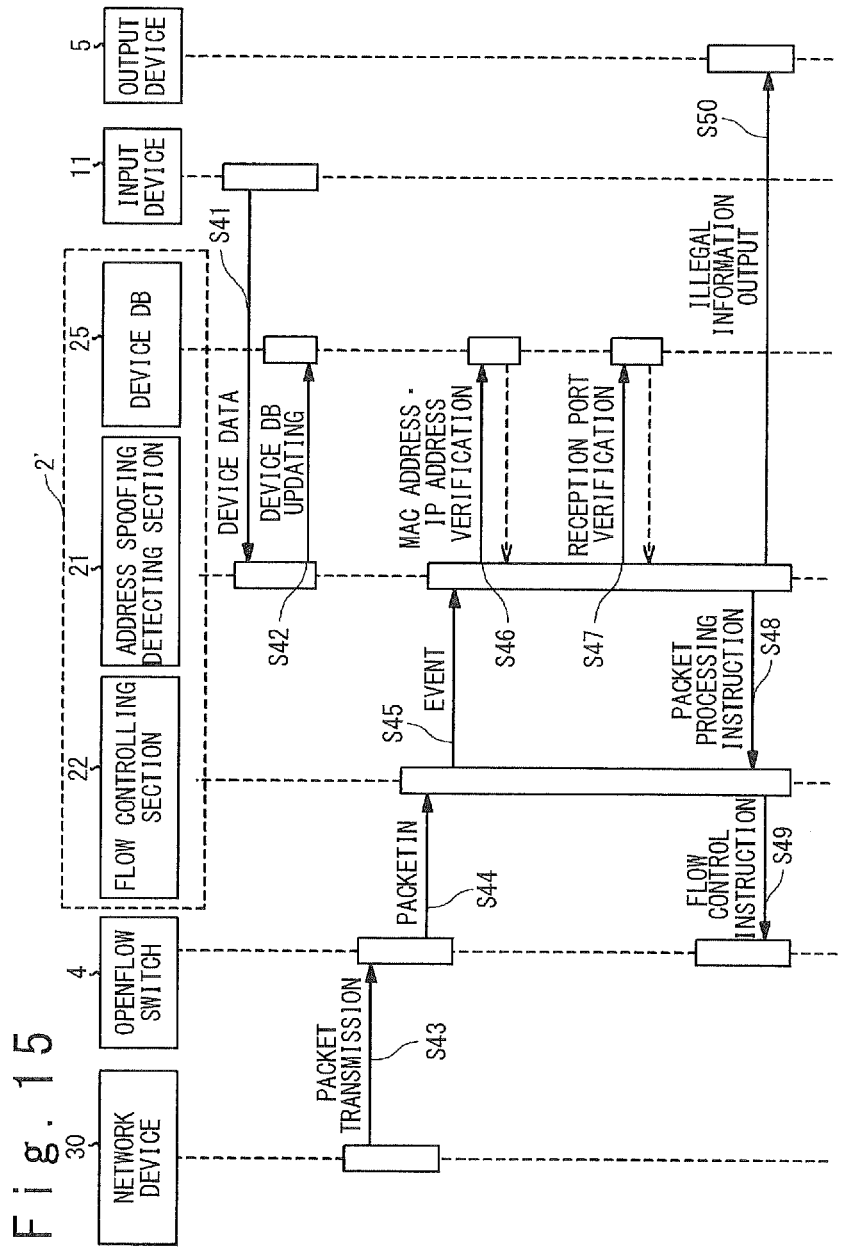
FIG. 15 is a sequence diagram showing an example of a network monitoring operation in the third exemplary embodiment.

With reference to FIG. 15, a network monitoring operation in the third exemplary embodiment will be described in detail.

With reference to FIG. 15, at first, when the computer system is activated, the device data 13 is recorded in advance from the input device 1' to the device database in the OFC 2' (Steps S41 and S42). In detail, the device data 13 given by the input device 1' is supplied to the address spoofing detecting section 21 and stored in the device database 25 (Steps S41 and S42). Consequently, the device database 25 is updated on the basis of the newest device data 13. Here, the device database 25 can be always retrieved by the address spoofing detecting section 21. Also, the device database 25 may be updated during the operation of the system.

In succession, the network monitoring operation when a packet is transferred from the network device 30 to the system is described. The network device 30 transmits a Gratuitous ARP packet or an IP packet (Step S43). At this time, the packet from the network device 30 is transferred to the OFS 4.

The OFS 4 judges whether header information of the Gratuitous ARP packet or IP packet received from a port connected to the network device 30 complies (coincides) with a rule of the flow entry set for itself. If there is a complying rule, the received packet is treated in accordance with the action corresponding to the rule (for example, transferring to the different OFS 4 or discarding) (which is not shown). On the other hand, if (a rule in) the flow entry complying (coinciding) with the header information of the received packet is not set, the OFS 4 notifies the flow controlling section 22 in the OFC 2' of the received packet as the first packet (Step S44). Here, the OFS 4 transmits the first packet or the header information of the first packet together with the DPID 63 of the OFS 4, to the flow controlling section 22 on the basis of the PacketIN.

The flow controlling section 22 to which the PacketIN is done extracts the verification information 6 from the information transmitted from the OFS 4 together with an asynchronous event and outputs to the address spoofing detecting section 21 (Step S45).

The address spoofing detecting section 21 extracts the transmission source address information 60 from the verification information 6 received together with the asynchronous event, and verifies the transmission source address of the first packet by using the device database 25 (Step S46: MAC Address•IP Address Verification). In detail, the address spoofing detecting section 21 verifies whether the device address information 130 (the MAC address 131 and the IP address 132) coincident with the transmission source address information 60 (the transmission source MAC address 61, the target IP address 62 or the transmission source IP address 65) exists in the device database 25 (MAC Address•IP Address Verification). Here, if the device address information 130 coincident with the transmission source address information 60 does not exist in the device database 25, the address spoofing detecting section 21 judges that one or both of the MAC address and the IP address is spoofed, and instructs the flow controlling section 22 to discard the packet (Step S48).

On the other hand, at the step S46, if the device address information 130 coincident with the transmission source address information 60 exists in the device database 25, the port name 134 corresponding to the device address information 130 is compared with the reception port number 64 obtained by the PacketIN (Step S47: Reception port Verification). At the step S47, if the port name 134 does not coincide with the reception port number 64, the address spoofing detecting section 21 judges that the reception port name is spoofed and instructs the flow controlling section 22 to discard the packet (Step S48).

On the other hand, at the step S47, if the port name 114 coincides with the reception port number 64, the address spoofing detecting section 21 judges that there is no address spoofing with regard to the first packet and instructs the flow controlling section 22 to set the flow entry for transferring the packet (Step S48)

Incidentally, the execution sequence of the MAC address•IP address verification at the step S46 and the reception port verification at the step S47 is not limited to the execution sequence shown in FIG. 15. So, these verifications may be executed at the opposite order or at the same time. Also, at the time of the MAC address•IP address verification or reception port verification, the coincidence between the DPID 133 in the device database 25 and the DPID 63 notified by the PacketIN may be verified.

At the step S48, the flow controlling section 22, which is instructed to discard the packet, discards the first packet of the PacketIN, and sets a flow entry, in which a part or all of the header information of the packet is used as a rule and packet discarding is used as an action, to the OFS 4 (Step S49). Consequently, if the OFS 4 receives the packet which is judged once whether it is spoofed, the packet is discarded without any notification to the OFC 2', and the invasion to the network of the illegal packet can be blocked at the entrance of the network.

On the other hand, at the step S48, the flow controlling section 22, which is instructed to transfer the packet, sets a flow entry, in which a part or all of the header information of the first packet of the PacketIN is used as a rule and packet transferring is used as an action, to the OFS 4 on the communication route (Step S49).

Also, the address spoofing detecting section 21, which judges that the address is spoofed at the steps S46 and S48, outputs the transmission source address information 60 received from the flow controlling section 22 together with the asynchronous event at the step S45, to the output device 5 (Step S50). In this case, the output device 5 visibly outputs the transmission source address information 60 (the transmission source MAC address 61 and the target IP address 62 or the transmission source IP address 65) as a spoofed address. Moreover, the address spoofing detecting section 21, when judging that the address is spoofed, may output the reception port number 64 to the output device 5. In this case, the output device 5 visibly outputs the reception port number 64.

With reference to FIG. 16, the specific example of the network monitoring operation in the third exemplary embodiment will be described below. FIG. 16 is a view showing the specific example to describe the configuration and operation of the computer system in the third exemplary embodiment. With reference to FIG. 16, the device database 25 registers, as the device data 13, the device address information 130: the MAC address 131: "MAC-d" and the IP address 132: "IP-d", the DPID 133: "SwitchA (DPID 01)", and the port name 134: "Port-X". Also, the network device 30 has one interface "IF-d". The OFS 4 "OpenFlow SwitchA" is connected through the port "Port-X" to the network device 30.

The network monitoring operation in the foregoing computer system will be described. When the network device transmits a Gratuitous ARP packet, the packet is transferred through the port "Port-X" to the OFS 4 "OpenFlow SwitchA". The OFS 4 "OpenFlow SwitchA" does the PacketIN of the received packet as the first packet to the flow controlling section 22.

Next, the flow controlling section 22 notifies the address spoofing detecting section 21 of the verification information 6 together with the asynchronous event in response to the PacketIN. Here, the transmission source MAC address 61: "MAC-d", the target IP address 62: "IP-d", the DPID 63: "DPID 01", and the reception port number 64: "Port-X" are notified as the verification information 6.

The address spoofing detecting section 21 carries out the MAC address•IP address verification by using the notified transmission source MAC address 61 "MAC-d" and target IP address 62 "IP-d". The device address information 130 "MAC-d" and "IP-d", which coincide with the transmission source MAC address 61 "MAC-d" and the target IP address 62 "IP-d", exist in the device database 25. Thus, in the MAC address•IP address verification, it is judged that there is no spoofed address. Also, the address spoofing detecting section 21 extracts the port name 134 "Port-X" corresponding to the device address information 130.

Next, the address spoofing detecting section 21 carries out the reception port verification. Here, the reception port number 64: "Port-X" received by the PacketIN coincides with the port name 134 "Port-X" extracted from the device database 25. Thus, in the reception port verification, it is judged that there is no spoofed address. At this time, the coincidence between the DPID 133 in the device database 25 and the DPID 133 received by the PacketIN may be verified. Here, the DPID 133 "DPID 01" coincides with the DPID 133 "DPID 01". Hence, it is judged that there is no spoofed address.

The address spoofing detecting section 21 judges, since judging that there is no spoofing as the result of all of the address spoofing verifications, that the Gratuitous ARP packet notified as the first packet uses the legal transmission source MAC address and target IP address, and then instructs the flow controlling section 22 to transfer the packet.

In response to the packet transfer instruction from the address spoofing detecting section 21, the flow controlling section 22 sets, for example, a flow entry defining a rule of the transmission source MAC address: "MAC-d" and the target IP address: "IP-d" and an action of "transferring to the different OFS 4", to the OFS 4 "OpenFlow SwitchA". Consequently, the OFS 4 "OpenFlow SwitchA", when receiving the ARP packet complying with the set rule, transfers the packet to the specified different OFS 4.

On the other hand, if it is judged that there is a spoofed address even in one of the foregoing address spoofing verifications, the flow controlling section 22 sets, for example, a flow entry defining a rule of the transmission source MAC address: "MAC-d" and the target IP address: "IP-a" and an action of "discarding of a packet", to the OFS 4 "OpenFlow SwitchA", in response to the packet discarding instruction from the address spoofing detecting section 21. Consequently, the OFS 4 "OpenFlow SwitchA" when receiving the ARP packet complying with the set rule, discards the packet.

Also, if it is judged that there is a spoofed address even in one of the foregoing address spoofing verifications, the verification information 6 which is supplied together with the asynchronous event to the address spoofing detecting section 21 is visibly outputted by the output device 5.

As mentioned above, according to the computer system in the third exemplary embodiment, it is possible to monitor the address spoofing packet between the network devices which use the openflow protocol and block the invasion to the network. In the first exemplary embodiment, the spoofing of the reception port is verified by obtaining the port number (reception port number) to which the virtual switch is connected from the host OS. However, in the third exemplary embodiment, since the notification source of the first packet is the physical switch, the spoofing of the reception port can be verified by using the pre-registered port name. Also, the other effects of the computer system according to the third exemplary embodiment are similar to the first exemplary embodiment.

As mentioned above, the exemplary embodiments of the present invention have been described in detail. However, the specific configurations are not limited to the above-mentioned exemplary embodiments. The modification without departing from the scope and spirit of the present invention is included in the present invention. Also, the first, second and third exemplary embodiments can be combined in the scope without any technical conflict. For example, the present invention can be applied to a computer system in which any of the virtual servers 3 and 3' and the network device 30 is installed.

Also, in the above-mentioned exemplary embodiments, the OFCs 2 and 2' obtain information of the virtual machine (the transmission source information 7) with the PacketIN as a trigger. However, this is not limited thereto. The information of the virtual machine in the system may be held as a database. Also, the OFCs 2 and 2' may transiently hold the information of the virtual machine (the transmission source information 7) obtained with the PacketIN as a trigger. After that, it may be used in the address spoofing verification for the first packet reported from the OFVS 33 or OFS 4.

The OFS and OFVS that are used in the computer system according to the present invention may be operated in accordance with the conventional openflow protocol (for example, the protocol defined by OpenFlow Switch Specification version 1.0). By changing only the function of OFC as described in the above-mentioned exemplary embodiments, it is possible to achieve the monitor of the network and the protection against the illegal access. That is, according to the present invention, by changing only the function of the OFC in the existing openflow system, it is possible to attain the monitor of the network and the protection against the illegal access as mentioned above. For this reason, the function for monitoring the network and the like can be added to the existing system cheaply and easily.

This application is based upon Japanese patent application No. 2010-275002, and the disclosure of the Japanese patent application No. 2010-275002 is incorporated herein in its entirety by reference.

The invention claimed is:

1. A computer system comprising:
    a controller;
    a switch configured to perform, on a received packet complying with a flow entry set by the controller, a relay operation regulated by the flow entry; and
    a virtual server configured to be connected to the switch,
    wherein the controller includes a virtual server database in which an IP (Internet Protocol) address of a legal virtual server and a DPID (Data Path ID) of the switch are correlated and recorded,
    wherein the switch notifies the controller of a received packet not complying with a flow entry set to itself together with its DPID,
    wherein the controller obtains an IP address from the virtual server database by using a DPID notified from the switch as a retrieval key, and obtains, from a virtual server accessed by using the IP address, a MAC address assigned to an interface used by a virtual machine installed in the virtual server, and
    when the obtained MAC address does not coincide with a transmission source MAC address of the received packet, the controller judges that a transmission source address of the received packet is spoofed.

2. The computer system according to claim 1, wherein when the controller judges that a transmission source address of the received packet is spoofed, the controller sets a flow entry, which defines that a packet of which the transmission source address is set as a transmission source is discarded, to the switch.

3. The computer system according to claim 1, wherein when an IP address of the legal virtual server does not coincide with a transmission source IP address of the received packet, the controller judges that a transmission source address of the received packet is spoofed.

4. The computer system according to claim 1, wherein the switch notifies the controller of a reception port name of a received packet not complying with a flow entry set to itself, and
    wherein when a port name of a switch connected to an interface used by the legal virtual server does not coincide with the reception port name, the controller judges that a transmission source address of the received packet is spoofed.

5. The computer system according to claim 1, wherein the controller holds a VM database in which a virtual machine name of a legal virtual machine and an address assigned to an interface used by the legal virtual machine are correlated, and wherein the controller extracts a virtual machine name from the VM database by using the transmission source address information as a retrieval key, and specifies a target virtual machine from which the MAC address is obtained.

6. The computer system according to claim 1, wherein the switch notifies the controller of a reception port name of a received packet not complying with a wherein the controller obtains an IP address from the virtual server database by using a DPID notified from the switch as a retrieval key, and obtains, from a virtual server accessed by using the IP address, a port name of a switch connected to an interface used by the virtual machine, and when the obtained port name does not coincide with the reception port name, the controller judges that a transmission source address of the received packet is spoofed.

7. The computer system according to claim 1, further comprising:

an output device configured to visibly output a transmission source address of the received packet when the controller judges that a transmission source address of the received packet is spoofed.

8. The computer system according to claim 7, wherein the switch notifies the controller of a reception port name of a received packet not complying with a flow entry set to itself, and wherein the output device visibly outputs the reception port name when the controller judges that a transmission source address of the received packet is spoofed.

9. A controller comprising:

a flow controlling section configured to set a flow entry to a switch;

a virtual server database in which an IP (Internet Protocol) address of a legal virtual server and a DPID (Data Path ID) of the switch are correlated and recorded;

wherein the switch performs, on a received packet complying with a set flow entry, a relay operation regulated by the flow entry, and notifies the flow controlling section of a received packet not complying with a flow entry set to itself together with its DPID; and an address spoofing detecting section configured to obtain an IP address from the virtual server database by using a DPID notified to the flow controlling section as a retrieval key, and obtain, from a virtual server accessed by using the IP address, a MAC (Media Access Control) address assigned to an interface used by a virtual machine installed in the virtual server, and when the obtained MAC address does not coincide with the transmission source MAC address, judge that a transmission source address of the received packet is spoofed.

10. The controller according to claim 9, wherein when the address spoofing detecting section judges that a transmission source address of the received packet is spoofed, the flow controlling section sets a flow entry, which defines that a packet of which the transmission source address is set as a transmission source is discarded, to the switch.

11. The controller according to claim 9, wherein when an IP address of the legal virtual server does not coincide with a transmission source IP address of the received packet, the address spoofing detecting section judges that a transmission source address of the received packet is spoofed.

12. The controller according to claim 9, wherein the switch notifies the flow controlling section of a reception port name of a received packet not complying with a flow entry set to itself, and wherein when a port name of a switch connected to an interface used by the legal virtual server does not coincide with a reception port name notified to the flow controlling section, the address spoofing detecting section judges that a transmission source address of the received packet is spoofed.

13. The controller according to claim 9, further comprising:

a VM database in which a virtual machine name of a legal virtual machine and an address assigned to an interface used by the legal virtual machine are correlated, and wherein the address spoofing detecting section extracts a virtual machine name from the VM database by using the transmission source address information as a retrieval key, and specifies a target virtual machine from which the MAC address is obtained.

14. The controller according to claim 9, wherein the switch notifies the controller of a reception port name of a received packet not complying with a flow entry set to itself, wherein the address spoofing detecting section obtains an IP address from the virtual server database by using a DPID notified from the switch as a retrieval key, and obtains, from a virtual server accessed by using the IP address, a port name of a switch connected to an interface used by the virtual machine, and when the obtained port name does not coincide with the reception port name, the address spoofing detecting section judges that a transmission source address of the received packet is spoofed.

15. A non-transitory computer-readable recording medium which records a network monitoring program realizing a controller when it is executed by a computer, to perform the following:

a flow controlling section setting a flow entry to a switch;

wherein the switch performs, on a received packet complying with a set flow entry, a relay operation regulated by the flow entry, and notifies the flow controlling section of a received packet not complying with a flow entry set to itself together with its DPID (Data Path ID);

an address spoofing detecting section obtaining an IP address from a virtual server database, in which an IP (Internet Protocol) address of a legal virtual server and a DPID of the switch are correlated and recorded, by using a DPID notified to the flow controlling section as a retrieval key;

the address spoofing detecting section obtaining, from a virtual server accessed by using the IP address, a MAC (Media Access Control) address assigned to an interface used by a virtual machine installed in the virtual server; and when the obtained MAC address does not coincide with the transmission source MAC address, the address spoofing detecting section judging that a transmission source address of the received packet is spoofed.

16. A network monitoring method executed by a computer system, which includes a switch configured to perform, on a received packet complying with a flow entry set by a controller, a relay operation regulated by the flow entry, the monitoring method comprising:
wherein the controller includes a virtual server database in which an IP address (Internet Protocol) of a legal virtual server and a DPID (Data Path ID) of the switch are correlated and recorded;
the switch notifying the controller of a received packet not complying with a flow entry set to itself together with its DPID;
the controller obtaining an IP address from the virtual server database by using a DPID notified from the switch as a retrieval key;
the controller obtaining, from a virtual server accessed by using the IP address, a MAC (Media Access Control) address assigned to an interface used by a virtual machine installed in the virtual server; and
when the obtained MAC address does not coincide with the transmission source MAC address, the controller judging that a transmission source address of the received packet is spoofed.

17. The network monitoring method according to claim 16, further comprising:
when judging that a transmission source address of the received packet is spoofed, the controller setting a flow entry, which defines that a packet of which the transmission source address is set as a transmission source is discarded, to the switch.

18. The network monitoring method according to claim 16, including:
when an IP address of the legal virtual server does not coincide with a transmission source IP address of the received packet, the controller judging that a transmission source address of the received packet is spoofed.

19. The network monitoring method according to claim 16, further comprising:
the switch notifying the controller of a reception port name of a received packet not complying with a flow entry set to itself; and
when a port name of a switch connected to an interface used by the legal virtual server does not coincide with the reception port name, the controller judging that a transmission source address of the received packet is spoofed.

20. The network monitoring method according to claim 16, wherein the controller holds a VM database in which a virtual machine name of a legal virtual machine and an address assigned to an interface used by the legal virtual machine are correlated,
the network monitoring method further comprising:
the controller extracting a virtual machine name from the VM database by using the transmission source address information as a retrieval key; and
the controller specifying a target virtual machine from which the MAC address is obtained.

21. The network monitoring method according to claim 16, comprising:
the switch notifying the controller of a reception port name of a received packet not complying with a flow entry set to itself,
the controller obtaining an IP address from the virtual server database by using a DPID notified from the switch as a retrieval key,
the controller obtaining, from a virtual server accessed by using the IP address, a port name of a switch connected to an interface used by the virtual machine, and
when the obtained port name does not coincide with the reception port name, the controller judging that a transmission source address of the received packet is spoofed.

22. The network monitoring method according to claim 16, further comprising:
outputting a transmission source address of the received packet when the controller judges that a transmission source address of the received packet is spoofed.

23. The network monitoring method according to claim 22, further comprising:
the switch notifying the controller of a reception port name of a received packet not complying with a flow entry set to itself; and
visibly outputting the reception port name when the controller judges that a transmission source address of the received packet is spoofed.

24. The computer-readable recording medium according to claim 15, further comprising:
when the address spoofing detecting section judging that a transmission source address of the received packet is spoofed, the flow controlling section setting a flow entry, which defines that a packet whose transmission source is indicated in the transmission source address is discarded, to the switch.

25. The computer-readable recording medium according to claim 15, including:
when an IP address of the legal virtual server does not coincide with a transmission source IP address of the received packet, the address spoofing detecting section judging that a transmission source address of the received packet is spoofed.

26. The computer-readable recording medium according to claim 15, further comprising:
when the switch notifies the flow controlling section of a reception port name of a received packet not complying with a flow entry set to itself, and when a port name of a switch connected to an interface used by the legal virtual server does not coincide with a reception port name notified to the flow controlling section, the address spoofing detecting section judging that a transmission source address of the received packet is spoofed.

27. The computer-readable recording medium according to claim 15, further comprising:
the address spoofing detecting section extracting a virtual machine name from a VM database, in which a virtual machine name of a legal virtual machine and an address assigned to an interface used by the legal virtual machine are correlated, by using the transmission source address information as a retrieval key, and
the address spoofing detecting section specifying a target virtual machine from which the MAC address is obtained.

28. The computer-readable recording medium according to claim 15, comprising:
when the switch notifies the controller of a reception port name of a received packet not complying with a flow entry set to itself,
the address spoofing detecting section obtaining an IP address from the virtual server database by using a DPID notified from the switch as a retrieval key,
the address spoofing detecting section obtaining, from a virtual server accessed by using the IP address, a port name of a switch connected to an interface used by the virtual machine, and
when the obtained port name does not coincide with the reception port name, the address spoofing detecting section judging that a transmission source address of the received packet is spoofed.

29. The computer system according to claim 1, wherein an IP address acquired by using the DPID as a key is the IP address of the legal virtual server corresponding to the switch that received the packet, and wherein a combination of IP address of the legal virtual server and switch DPID are registered in the virtual server database.

\* \* \* \* \*